US009442561B2

(12) United States Patent
Itoh

(10) Patent No.: US 9,442,561 B2
(45) Date of Patent: Sep. 13, 2016

(54) DISPLAY DIRECTION CONTROL FOR DIRECTIONAL DISPLAY DEVICE

(71) Applicant: PFU LIMITED, Kahoku-shi, Ishikawa (JP)

(72) Inventor: Yasunari Itoh, Kahoku (JP)

(73) Assignee: PFU LIMITED, Kahoku-shi (JP)

( * ) Notice: Subject to any disclaimer, the term of this patent is extended or adjusted under 35 U.S.C. 154(b) by 26 days.

(21) Appl. No.: 14/537,125

(22) Filed: Nov. 10, 2014

(65) Prior Publication Data
US 2015/0054739 A1 Feb. 26, 2015

Related U.S. Application Data

(63) Continuation of application No. PCT/JP2012/064404, filed on Jun. 4, 2012.

(51) Int. Cl.
*G06F 3/00* (2006.01)
*G09G 5/00* (2006.01)
(Continued)

(52) U.S. Cl.
CPC ............ *G06F 3/005* (2013.01); *G06F 3/011* (2013.01); *G06F 3/013* (2013.01); *G06F 3/017* (2013.01); *G06F 3/0481* (2013.01);
(Continued)

(58) Field of Classification Search
CPC .... G06F 3/005; G06F 3/011; G06F 3/04815; G06F 3/017; G06F 3/0481; G06F 3/013; G09G 5/36; G09G 5/00
See application file for complete search history.

(56) References Cited

U.S. PATENT DOCUMENTS

| 5,808,792 A * | 9/1998 | Woodgate .......... G02B 27/0093 348/59 |
| 2009/0109126 A1 | 4/2009 | Stevenson et al. |
| 2010/0002079 A1* | 1/2010 | Krijn ................. G02B 27/0093 348/148 |

FOREIGN PATENT DOCUMENTS

| JP | 3705643 B2 | 10/2005 |
| JP | 2007-310002 A | 11/2007 |
| JP | 2009-169352 A | 7/2009 |
| JP | 2009-192552 A | 8/2009 |

(Continued)

OTHER PUBLICATIONS

Notification of Transmittal of Translation of the International Preliminary Report on Patentability (Form PCT/IB/338) of International Application No. PCT/JP2012/064404 mailed Dec. 18, 2014 with Forms PCT/IB/373 and PCT/ISA/237.
International Search Report dated Aug. 28, 2012, issued in corresponding application No. PCT/JP2012/064404.

*Primary Examiner* — Andrew Sasinowski
(74) *Attorney, Agent, or Firm* — Westerman, Hattori, Daniels & Adrian, LLP

(57) ABSTRACT

An information processing device connected to a display device capable of varying display contents according to display directions, the information processing device including: a position information acquiring unit to acquire position information on an object within a range from which the display device is viewable; a display direction determining unit to determine, based on the position information, a first display direction in which a first partial area of the display device is viewable from a position of the object and a second display direction in which a second partial area of the display device is viewable from the position of the object; and a display control unit that causes the display device to display contents so that the contents are displayed in the first display direction in the first partial area and the contents are displayed in the second display direction in the second partial area.

7 Claims, 31 Drawing Sheets

(51) Int. Cl.
  *G09G 5/36*  (2006.01)
  *G06F 3/01*  (2006.01)
  *G06F 3/0481*  (2013.01)
(52) U.S. Cl.
  CPC ............ *G06F 3/04815* (2013.01); *G09G 5/00* (2013.01); *G09G 5/36* (2013.01)

(56) References Cited

FOREIGN PATENT DOCUMENTS

| | | |
|---|---|---|
| JP | 2009-540381 A | 11/2009 |
| JP | 2011-70680 A | 4/2011 |

\* cited by examiner

FIG. 9

| POSITION INFORMATION | DISPLAY DIRECTION |
|:---:|:---:|
| α | A |
| β | B |
| γ | C |
| ⋮ | ⋮ |

FIG. 12

| USER IDENTIFICATION INFORMATION | USER POSITION INFORMATION | USER AREA MAP | NON-DISCOVERY COUNTER |
|---|---|---|---|
| . . . | . . . | . . . | . . . |
| . . . | . . . | . . . | . . . |

FIG. 18

| LOG-IN ID | VIEWER AUTHORITY |
|---|---|
| yamada | 1 |
| suzuki | 3 |
| satoh | 5 |
| ⋮ | ⋮ |

FIG. 19

| CONTENT ID | VIEWABLE AUTHORITY |
|---|---|
| FINANCIAL STATEMENT | 1 |
| MONTHLY BUSINESS REPORT | 3 |
| PRODUCTION PLAN | 5 |
| ⋮ | ⋮ |

FIG. 25

| POSITION INFORMATION | PARTIAL AREA | DISPLAY DIRECTION |
|---|---|---|
| α | a | A |
| β | a | B |
| γ | a | C |
| . . . | . . . | . . . |
| ω | z | Z |

FIG. 28

| PARTIAL AREA | DISPLAY DIRECTION |
|---|---|
| a | A |
| b | B |
| c | B |
| d | C |
| e | D |

EACH USER'S PARTIAL AREA TABLE

FIG. 31

| PARTIAL AEA | DISPLAY DIRECTION |
|---|---|
| a | $\theta(a) = \arctan((x-\Delta d(a))/z)$ |
| b | $\theta(b) = \arctan((x-\Delta d(b))/z)$ |
| c | $\theta(c) = \arctan((x-\Delta d(c))/z)$ |
| d | $\theta(d) = \arctan((x-\Delta d(d))/z)$ |
| e | $\theta(e) = \arctan((x-\Delta d(e))/z)$ |

EACH USER'S PARTIAL AREA TABLE

DISPLAY DIRECTION CONTROL FOR DIRECTIONAL DISPLAY DEVICE

CROSS-REFERENCE TO RELATED APPLICATION

This application is a continuation application of International Application PCT/JP2012/064404 filed on Jun. 4, 2012 and designated the U.S., the entire contents of which are incorporated herein by reference.

FIELD

The present invention relates to a display device capable of varying contents to be displayed according to display directions.

BACKGROUND

Conventionally, an interactive multi-view display system is proposed which is a system including a multi-view display and a detecting device and which detects which user among a plurality of users is trying to interact with one of displayed images (refer to Japanese Patent Application Publication No. 2011-070680).

Furthermore, a display system is proposed which includes a multi-view display panel and which fetches information on a viewer and uses the information to control display of a plurality of images at various suitable viewing angles (refer to Japanese Patent Application Publication No. 2009-540381).

In addition, an observer tracking autostereoscopic display device is proposed in which when a pattern including at least three image areas that are repetitively arranged is defined and when it is detected that the eyes of an observer are moving from an image area where the observer is currently positioned toward an adjacent image area and are about to enter the adjacent image area, control is performed so that an image displayed in the adjacent image area is updated to an image displayed in the current image area and, at the same time, the image displayed in the current image area is not updated (refer to Japanese Patent No. 3705643).

SUMMARY

One aspect of the present disclosure is an information processing device connected to a display device capable of varying display contents according to display directions, the information processing device including: a position information acquiring unit to acquire position information on an object within a range from which the display device is viewable; a display direction determining unit to determine, based on the position information, a first display direction in which a first partial area of the display device is viewable from a position of the object and a second display direction in which a second partial area of the display device is viewable from the position of the object; and a display control unit to cause the display device to display contents so that the contents are displayed in the first display direction in the first partial area and the contents are displayed in the second display direction in the second partial area.

In addition, the present disclosure can also be considered as being a method that is executed by a computer or a program to be executed on a computer.

Furthermore, the present disclosure may be embodied by a recording medium which is readable by a device such as a computer, a machine, or the like and on which such a program is recorded.

In this case, a recording medium that is readable by a computer or the like refers to a recording medium which stores information such as data and programs by an electric action, a magnetic action, an optical action, a mechanical action, or a chemical action and which can be read by a computer or the like.

BRIEF DESCRIPTION OF THE DRAWINGS

FIG. 9 is a diagram showing a configuration of a calibration table according to an embodiment;

FIG. 12 is a diagram showing a configuration of a user information table used in an embodiment;

FIG. 18 is a diagram showing a configuration of a viewer authority management table according to an embodiment;

FIG. 19 is a diagram showing a configuration of a content level management table according to an embodiment;

FIG. 25 is a diagram showing a configuration of a calibration table that takes a display area parallax into consideration according to an embodiment;

FIG. 28 is a diagram showing a configuration of a partial area table used in an embodiment;

FIG. 31 is a diagram showing a configuration of each user's partial area table created by an arithmetic processing method.

DESCRIPTION OF EMBODIMENTS

Hereinafter, an embodiment of an information processing device according to of the present disclosure will be described with reference to the drawings.

It should be noted that the embodiment described below merely represents an example of implementing the present disclosure and is not intended to limit the present disclosure to the specific configuration described below.

When implementing the present disclosure, a specific configuration may be adopted as appropriate in accordance with each embodiment.

In the present embodiment, the information processing device according to the present disclosure may be implemented as a human interface device provided in an operation object such as an elevator, a car navigation device, an audio device, an information kiosk terminal, a self-checkout terminal, and an electronic appliance.

However, objects of application of the present disclosure are not limited to the examples described above.

<Configuration of Device>

Figure 1:
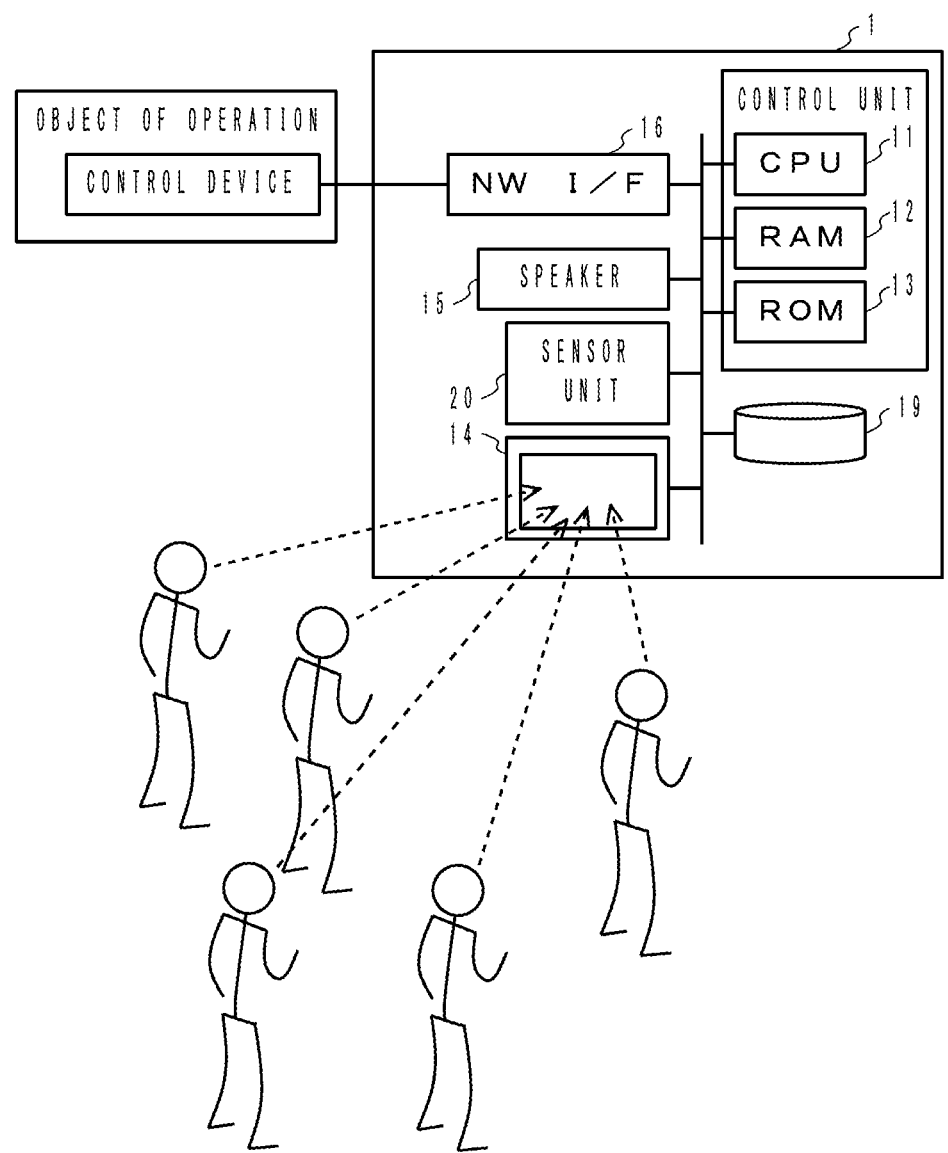
FIG. 1 is a diagram schematically showing a hardware configuration of an information processing device according to an embodiment.

FIG. 1 is a diagram schematically showing a hardware configuration of an information processing device 1 according to the present embodiment.

The information processing device 1 is an information processing device to which a central processing unit (CPU) 11, a random access memory (RAM) 12, a read only memory (ROM) 13, an auxiliary storage device 19, a directional display device 14, a speaker 15, a network interface 16, and a sensor unit 20 are electrically connected. In addition, the information processing device 1 is connected to a control device of an object of operation (an elevator or the like) via the network interface 16.

However, when implementing the present disclosure, a device according to the present disclosure need not necessarily comprise all of the components described above. Components may be omitted, replaced, or added as appropriate according to each embodiment in a specific hardware configuration of the device.

The CPU 11 is a central processing unit and controls the respective components of the information processing device 1 including the RAM 12, the auxiliary storage device 19, and an input/output device by processing commands and data deployed on the RAM 12, the ROM 13, and the like. In addition, the RAM 12 is a primary storage device controlled by the CPU 11, and various commands and data are written onto and read from the RAM 12. In other words, the CPU 11, the RAM 12, and the ROM 13 constitute a control unit of the information processing device 1.

The auxiliary storage device 19 is a non-volatile storage device. Information that is desirably retained even after shutting down the information processing device 1 including an operating system (OS) of the information processing device 1 that is loaded onto the RAM 12, various programs for executing the processing presented in the flow charts described later, and various data to be used by the information processing device 1 are mainly written into and read from the auxiliary storage device 19. For example, an electrically erasable programmable ROM (EEPROM) or a hard disk drive (HDD) can be used as the auxiliary storage device 19.

The directional display device 14 is a directional display device (hereinafter, referred to as a "uniaxial-directional display device" or a "biaxial-directional display device") which enables directional display in a uniaxial direction (for example, a horizontal direction) or a biaxial direction (for example, a horizontal direction and a vertical direction) by varying pixels to be viewed according to directions in which a display area is viewed using techniques such as a lens with which multiple viewpoints are obtainable (a lenticular lens, a fly-eye lens, or the like) or a parallax barrier. However, a display device that is used as the directional display device 14 need only be capable of varying contents to be viewed by a user according to viewing directions and can acquire directionality by adopting other techniques. In addition, content projection techniques used by the directional display device 14 are not particularly limited insofar as such techniques can coexist with a configuration for directional display. For example, a flat panel display, a projector, and the like can be used to project contents.

Figure 2:
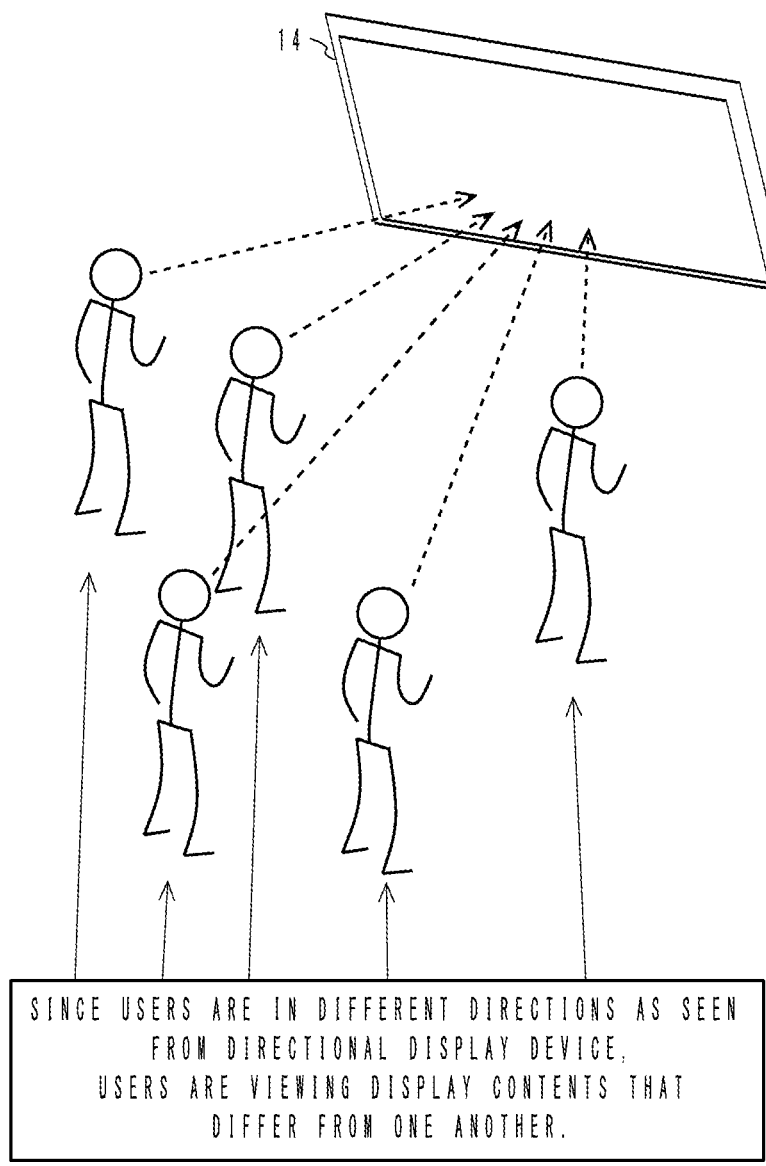
FIG. 2 is a diagram showing how viewed contents differ from one another depending on positions of users viewing a directional display device according to an embodiment.

FIG. 2 is a diagram showing how viewed contents differ from one another depending on positions of users viewing the directional display device 14 according to the present embodiment.

With the information processing device 1 according to the present embodiment, the directional display device 14, the speaker 15, the sensor unit 20, and the like are mainly used as input/output devices. Under the control of the CPU 11, by outputting data and accepting operations by a user, the information processing device 1 provides information through the user's five senses and accepts input by the user via a gesture operation made by the user. Contents inputted from the input/output devices are recorded on the RAM 12 and processed by the CPU 11. In addition to input via the sensor unit 20 and output via the directional display device 14, input and output by sound using a microphone (not shown) and the speaker 15 can be used as interfaces.

In addition, the speaker 15 included in the information processing device 1 may be a directional speaker. By conforming an output direction of acoustics from the directional speaker to a display direction of the directional display device 14, the information processing device 1 is able to provide both visual and acoustic output of contents that differ for each user in response to operations inputted by a plurality of users. The output direction of acoustics from the directional speaker may be determined by referring to user position information in a similar manner to determining the display direction of the directional display device 14.

In addition to body gestures and hand gestures, gestures may include transferring a gaze and the like. Furthermore, an operation by the user may involve an utterance or the like in addition to a gesture. Moreover, an operation by the user may be an action consciously performed by a user or an action unconsciously performed by a user. However, an operation need not be an action by a user. For example, an operation by a user may be performed using a device that is operated by the user such as a controller or a mobile terminal device.

The sensor unit 20 recognizes a user or the eyes of the user and acquires information for detecting a gesture made by a user. The sensor unit 20 includes one or a plurality of sensors and adopts a configuration capable of simultaneously recognizing the presence and positions of the users or the eyes of a plurality of users and simultaneously detecting gestures made by the plurality of users. In a case where the eyes of a user are recognized, the left and right eyes may be recognized as objects different from each other. Hereinafter, examples of specific configurations of the sensor unit 20 will be described.

Figure 3:
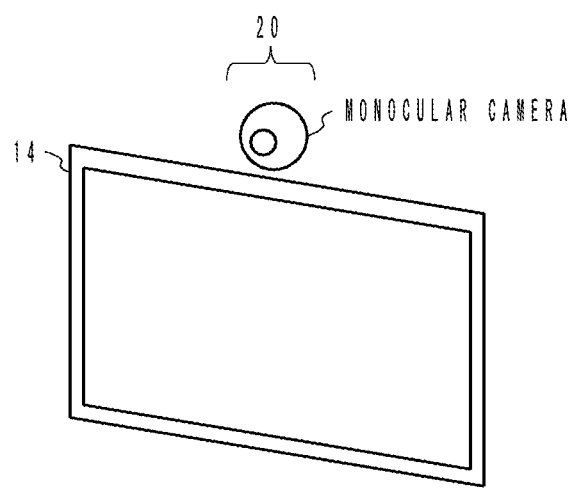
FIG. 3 is a diagram showing an example of a sensor unit arrangement when a sensor unit including a monocular camera is used in an embodiment.

(1) Monocular Camera that Captures Images in at Least One of Visible Light (RGB) and Infrared Light FIG. 3 is a diagram showing an arrangement example of the sensor unit 20 when a sensor unit 20 including a monocular camera that captures images in at least one of visible light (RGB) and infrared light is used according to the present embodiment. Based on image information acquired from the monocular camera, the information processing device 1 is capable of acquiring user position information using image analysis technology including facial recognition technology or using eye gaze recognition technology, detecting a gesture using moving image analysis technology, and the like.

Figure 4:
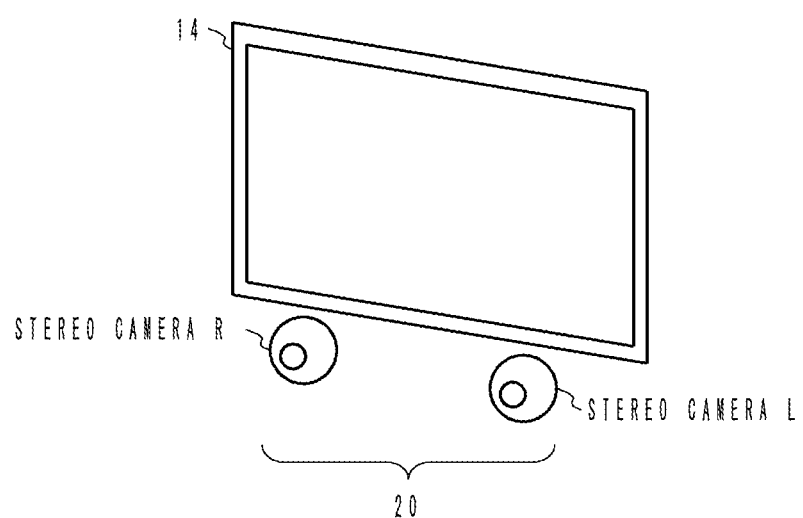
FIG. 4 is a diagram showing an example of a sensor unit arrangement when a sensor unit including a stereo camera is used in an embodiment.

(2) Stereo Camera that Captures Images in at Least One of Visible Light and Infrared Light FIG. 4 is a diagram showing an arrangement example of the sensor unit 20 when a sensor unit 20 including a stereo camera that captures images in at least one of visible light and infrared light is used according to the present embodiment. In addition to comprising functions similar to those of a monocular camera, the sensor unit 20 can be used as a so-called depth sensor by adopting a method (a passive stereo method) in which images captured by the stereo camera are compared and a distance to a subject is calculated based on a parallax. When a depth sensor is used, depth information can be obtained. Depth information is information including a distance (depth) to a captured subject and can be acquired using a passive stereo method, a structured light projection method, a round-trip propagation time method, or the like.

Figure 5:
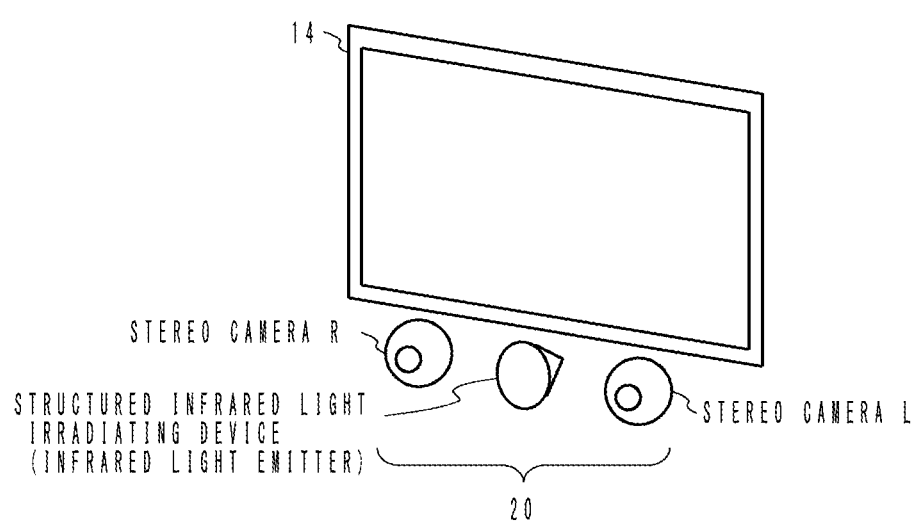
FIG. 5 is a diagram showing an example of a sensor unit arrangement when a sensor unit including a combination of a structured infrared light irradiating device and a camera is used in an embodiment.

(3) Combination of Structured Infrared Light Irradiating Device and Infrared Camera FIG. 5 is a diagram showing an arrangement example of the sensor unit 20 when a sensor unit 20 including a combination of a structured infrared light irradiating device (or an infrared emitter) and an infrared camera is used in the present embodiment. In addition to comprising functions similar to those of a monocular camera, the sensor unit 20 can be used as a so-called depth sensor by adopting a method in which reflected light of structured infrared light that is irradiated from a structured infrared light irradiating device is captured by an infrared camera (a structured light projection method) or a method in which reflected light of an infrared pulse that is irradiated from an infrared emitter is captured by an infrared camera and a time of flight (TOF) of the irradiated infrared pulse is measured (a round-trip propagation time method). Furthermore, eye gaze recognition can also be performed by imaging irradiated infrared light that is reflected off of an eye of a user with a camera and judging whether or not an eye gaze of the user is oriented toward a point of view of imaging of the camera based on the imaging result.

However, even when a structured infrared light irradiating device is used, the sensor unit 20 may further include a visible light camera and a camera capable of imaging visible light in addition to infrared light can be adopted as the camera for imaging reflected light of the infrared pulses. This is because although position information detection and gesture detection can be performed based on images captured by an infrared camera, facial recognition can be performed with higher accuracy when a visible light camera is further provided.

<Calibration>

With the directional display device 14 described above, in order to make desired contents viewable to a user in conformity to a position of the head, eyes, or the like (a viewpoint position) of the user, favorably, a viewpoint position is recognized using the sensor unit 20 and contents to be made viewable from the viewpoint position are outputted for each display direction corresponding to the viewpoint position. In this case, "display direction" refers to a direction in which, when performing display with the display device according to the present disclosure so that contents to be viewed are varied according to viewing positions, an object (a viewer) whose contents are viewable is present as seen from a display area of the display device. Such a display direction may be acquired using a calculation formula or a table prepared in advance based on position information of a viewpoint position or may be calculated by geometric calculation from position information of a viewpoint position and a relative positional relationship between a position of the directional display device 14 and a position of a sensor.

In many cases, increasing a degree of coincidence between a viewpoint position recognized by the sensor unit 20 and a display direction of the directional display device 14 requires adjustment. While such adjustment can be performed manually, manual adjustment requires extensive experience and takes time. Therefore, in the present embodiment, calibration between a viewpoint position recognized by the sensor unit 20 and a display direction of the directional display device 14 is to be performed using a calibration device.

Hereinafter, a device and a method for performing calibration with respect to the directional display device 14 between a viewpoint position and a display direction of the directional display device 14 will be described. For example, the calibration is carried out when the directional display device 14 is manufactured, inspected, or installed.

In the present embodiment, due to the information processing device 1 being connected to the detector 9 and executing a program for calibration, the information processing device 1 functions as a calibration device. However, the calibration device may be realized as a separate information processing device from the information processing device 1. In this case, the calibration device is a computer which includes a CPU, a RAM, a ROM, and an auxiliary storage device and which is connected to the information processing device 1 and the detector 9.

The detector 9 is a device capable of detecting display by the directional display device 14. Any kind of device may be used as the detector 9 as long as output from the directional display device 14 can be detected. The detector 9 may be capable of detection to such a degree that output contents can be discerned or simply capable of detecting that output has been performed by the directional display device 14. In the present embodiment, a camera is used as the detector 9. The detector 9 detects output from the directional display device 14 and notifies detected contents to the calibration device (in the present embodiment, the information processing device 1).

The detector 9 used in the present embodiment includes a lamp that blinks when the detector 9 detects display by the directional display device 14. By being provided at a position where the lamp can be recognized from the sensor unit 20 in a state where the detector 9 is installed, the lamp serves to notify the calibration device that detection has been performed by the detector 9. However, when the calibration device is capable of acquiring position information of the detector 9 related to detection using other means of communication, the detector 9 need not include the lamp.

Figure 6:
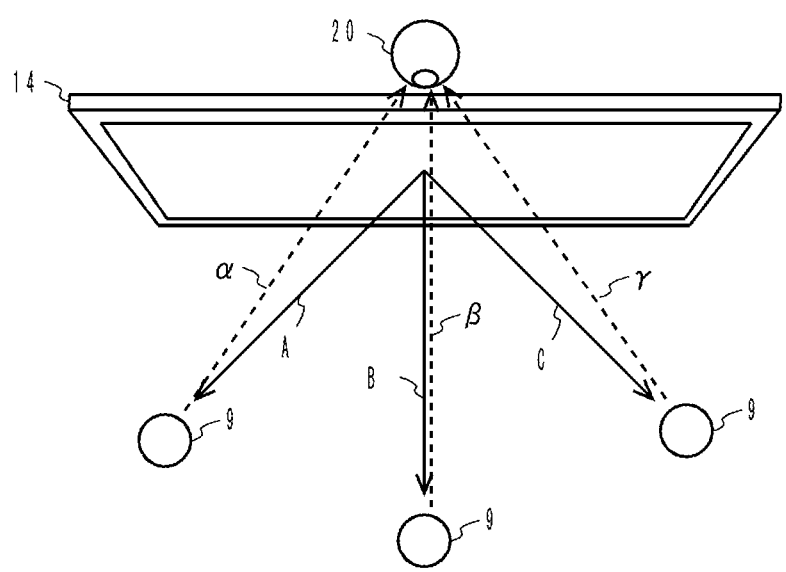
FIG. 6 is a diagram showing how detectors are installed for calibration according to an embodiment.
Figure 7:
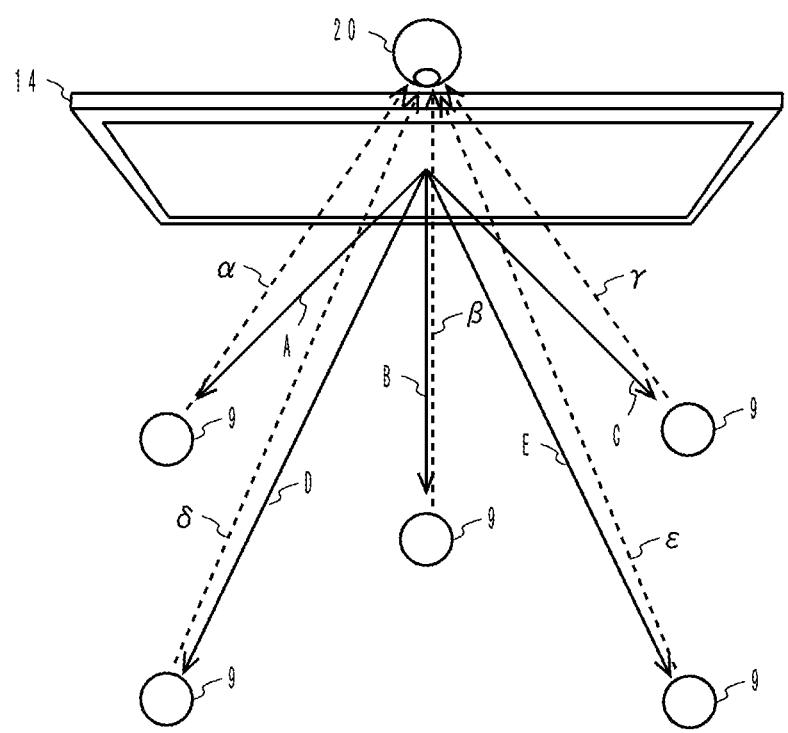
FIG. 7 is a diagram showing how detectors are installed for calibration according to an embodiment.

FIGS. 6 and 7 are diagrams showing how detectors 9 are installed for calibration according to the present embodiment. The detectors 9 are installed at positions where display by the directional display device 14 is viewable. FIG. 6 shows an example of an arrangement in which a plurality of the detectors 9 are lined approximately at equal distances as seen from the directional display device 14. This arrangement is suitable for calibration for a uniaxial-directional display device. FIG. 7 shows an example in which the detectors 9 are arranged at different distances as seen from the directional display device 14. This arrangement is suitable for calibration for a biaxial-directional display device. However, the arrangements of the detectors 9 shown in the diagrams are merely examples and the detectors 9 are favorably installed at a plurality of positions where viewpoints of users can exist in a state in which the directional display device 14 has been installed for operation. Moreover, dashed arrows ($\alpha$) to ($\epsilon$) shown in the diagrams indicate respective positions of the detectors 9 (viewpoint positions) as recognized by the sensor unit 20 and solid arrows (A) to (E) in the diagrams indicate directions of the detectors 9 as seen from the directional display device 14 (display directions).

Figure 8:
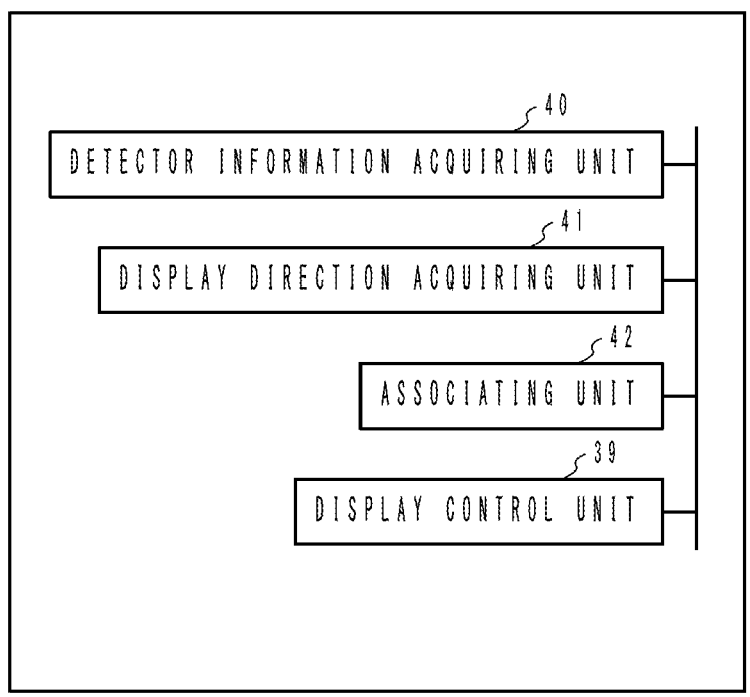
FIG. 8 is a diagram schematically showing a functional configuration of a calibration device according to a present embodiment.

FIG. 8 is a diagram schematically showing a functional configuration of a calibration device according to the present embodiment. Due to the CPU 11 interpreting and executing various programs deployed on the RAM 12, the information processing device 1 according to the present embodiment functions as a calibration device including a detector information acquiring unit 40, a display control unit 39, a display direction acquiring unit 41, and an associating unit 42. In addition, although an example in which all of these functions are executed by a general-purpose CPU 11 is explained in the present embodiment, a part of or all of these functions may be realized by one or a plurality of dedicated processors.

The detector information acquiring unit 40 acquires detector information of a detector 9 installed in a range from which display by the directional display device 14 is viewable. In this case, detector information includes information relating to a position of the detector 9 acquired using the sensor unit 20. In addition, information relating to a position of the detector 9 includes, for example, information indicating a direction of the detector 9 from the sensor unit 20.

The display control unit 39 according to the present embodiment controls display contents, display directions, and the like of the directional display device 14. In calibration processing, the display control unit 39 causes the directional display device 14 to perform display such that display contents or a display timing differs for each display direction.

The display direction acquiring unit 41 acquires a display direction in which display is recognizable from the position where the detector 9 is installed based on display contents or a display timing of the directional display device 14 as detected by the detector 9.

The associating unit 42 associates the acquired detector information and the acquired display direction with each other.

FIG. 9 is a diagram showing a configuration of a calibration table according to the present embodiment. The calibration table stores position information of an installation position (viewpoint position) and a display direction as detected by the detector 9 in association with each other for each installation position of the detector 9. The calibration table is generated by calibration processing and is subsequently referred to in order to determine a display direction for each viewpoint position. Moreover, position information of a viewpoint position may be expressed by a direction (angle or the like) as seen from the sensor unit 20 or the directional display device 14, a combination of a direction (angle or the like) and a distance, a vector, or a coordinate.

Figure 10:
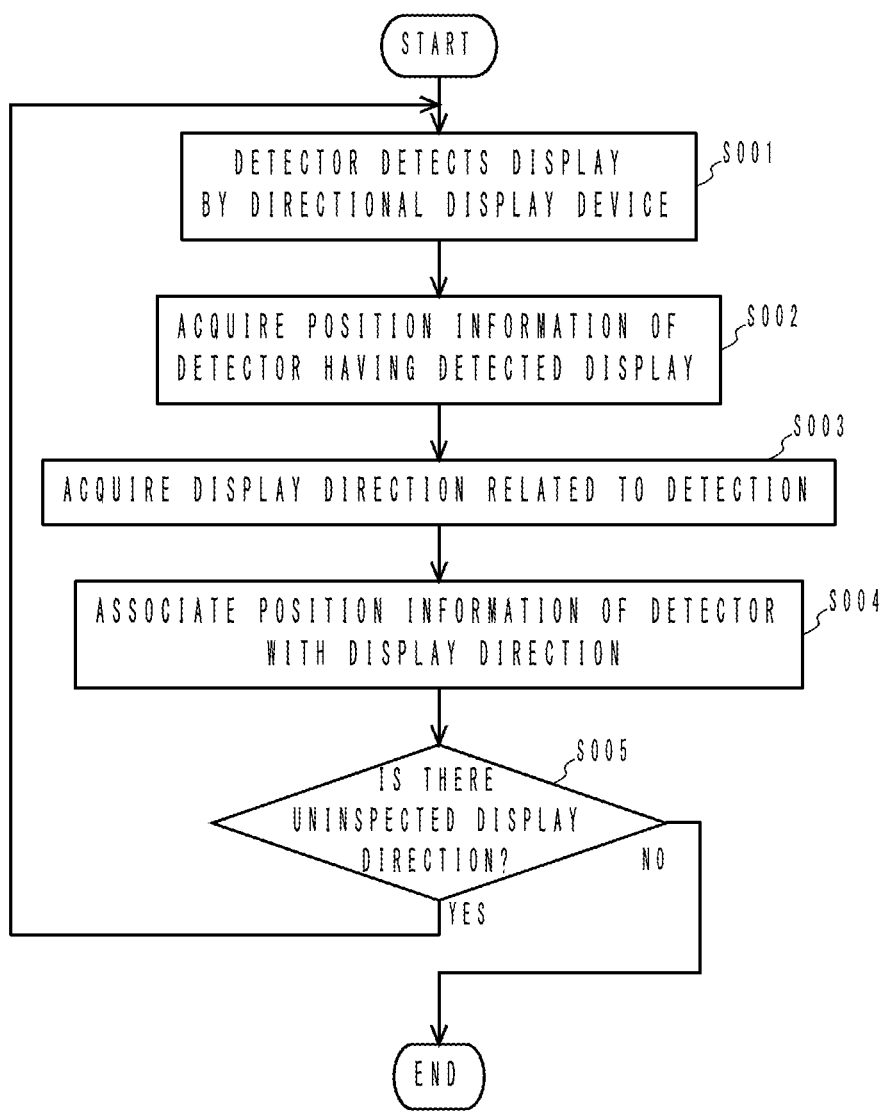
FIG. 10 is a flow chart showing a flow of calibration processing according to an embodiment.

FIG. 10 is a flow chart showing a flow of calibration processing according to the present embodiment. Hereinafter, a flow of calibration processing according to the present embodiment will be described with reference to the flow chart. Moreover, specific contents, a sequence of processing, and the like shown in the flow charts in the present embodiment merely represent one example of implementing the present disclosure. Favorably, specific processing contents, a processing sequence, and the like are appropriately selected for each embodiment.

In step S001, display by the directional display device 14 and detection of the display by the detector 9 are performed. The display control unit 39 causes the directional display device 14 to perform display in one uninspected display direction among the display directions that are displayable by the directional display device 14. In this case, the calibration processing shown in the present flow chart is performed while switching among display directions as will be described later in step S005. Therefore, the display by the display control unit 39 is to be performed at a different timing for each display direction. In addition, the detector 9 performs detection of display while the display is being performed. Subsequently, the processing proceeds to step S002.

In step S002, position information of the detector 9 having detected the display is acquired. The detector information acquiring unit 40 acquires a notification indicating that display has been detected from the detector 9 that detected the display in step S001. In the present embodiment, the detector 9 having detected display by the directional display device 14 notifies the calibration device that the display has been detected by performing a display (for example, blinking of a lamp provided on the detector 9) signifying detection of the display. The calibration device analyzes an image acquired by the sensor unit 20 and recognizes the detector 9 performing display signifying that display has been detected. Due to the image analysis, the detector information acquiring unit 40 receives the notification from the detector 9 having detected display by the directional display device 14. Furthermore, the detector information acquiring unit 40 acquires detector information that is information relating to the position of the detector 9. In this case, the detector information includes position information of the detector 9 acquired by analyzing the image acquired by the sensor unit 20. Subsequently, the processing proceeds to step S003.

In step S003, a display direction related to detection is acquired. When there is a detector 9 having detected display in step S001, the display direction acquiring unit 41 acquires the display direction in which the display had been performed in step S001 as a display direction in which display is recognizable from the position where the detector 9 is installed. As described in step S001, the display by the display control unit 39 is performed at a different display timing for each display direction. Therefore, the display direction acquiring unit 41 can acquire a display direction in which the display had been performed based on a timing at which the display had been detected by the detector 9. Subsequently, the processing proceeds to step S004.

In step S004, the position information of the detector 9 and the display direction are associated with each other. The associating unit 42 associates the position information of the detector 9 acquired in step S002 and the display direction in which the display had been performed in step S001 with each other and records the associated position information and display direction in the calibration table. Subsequently, the processing proceeds to step S005.

In step S005, a judgment is made on whether or not there is an uninspected display direction. The calibration device judges whether or not there is a display direction which is an inspection object but which is uninspected. When it is judged that there is an uninspected display direction, the processing proceeds to step S001. In other words, in the processing shown in the present flow chart, the processing of steps S001 to S004 is repeated until inspection is performed for all display directions that are objects of the inspection. On the other hand, when it is judged that there is no uninspected display direction, the processing shown in the present flow chart is completed.

Due to a calibration table being generated by the calibration processing described above, when causing desired contents to be viewable by a user or the eyes of a user recognized by the sensor unit 20, the directional display device 14 can obtain an accurate corresponding display direction by simply searching the calibration table based on position information of a position of the recognized user or the eyes of the recognized user (viewpoint position).

Alternatively, the display control unit 39 may perform display control based on display control information prepared in advance which indicates a relationship between a display direction and display contents or a display timing, and the display direction acquiring unit 41 may acquire a display direction in which display is recognizable from the position where the detector 9 is installed based on display contents or a display timing by referring to the display control information.

For example, the display control unit 39 may cause the directional display device 14 to perform display simultaneously in a plurality of display directions by altering display contents (colors or images) for each display direction. In this case, by having the calibration device retain display control information indicating a relationship between a display direction and display contents, the display control information can be searched based on the display contents detected by the detector 9 and a display direction of the display detected by each detector 9 can be identified.

In addition, when display by the directional display device 14 is detected by a plurality of detectors 9, a weighted average value of the position information of the plurality of detectors 9 may be stored as position information in the calibration table. A configuration may be adopted in which a gap between the detectors 9 is complemented linearly or complemented using a suitable approximation curve. A gap between table elements may also be complemented and a weighted average of display directions may be calculated.

Moreover, in the calibration processing described above with reference to the flow chart, a viewpoint position where detection of display had been performed is informed by causing a lamp or the like of a detector 9 to blink upon detection and acquiring position information of the detector 9 at which blinking of the lamp or the like had occurred. However, instead of such a method, a viewpoint position where display had been detected may be informed according to a detector identifier notified by the detector 9 having detected the display. In this case, the detector 9 having detected the display performs notification that display has been detected by notifying the detector identifier to the calibration device, and the calibration device acquires position information of the detector 9 by searching a table that associates the detector identifier and position information of a detector installation position (viewpoint position) with each other using the detector identifier.

As a method of associating a detector identifier and a detector installation position (viewpoint position) with each other, for example, a method may be adopted in which a different label (a detector identifier or the like) is attached to a front surface of each detector 9, the detector identifier is acquired by analyzing an image obtained from the sensor unit 20, and the detector identifier and position information of the detector 9 are associated with each other. Alternatively, a method may be adopted in which a newly added detector 9 is detected by the sensor unit 20 every time a detector 9 is installed and position information of a detected position (viewpoint position) is associated with a detector identifier of the added detector 9. When such a method is adopted, in the calibration processing, the detector 9 notifies the fact that detection had been performed as well as its own detector identifier to the calibration device.

<Directional Display>

Figure 11:
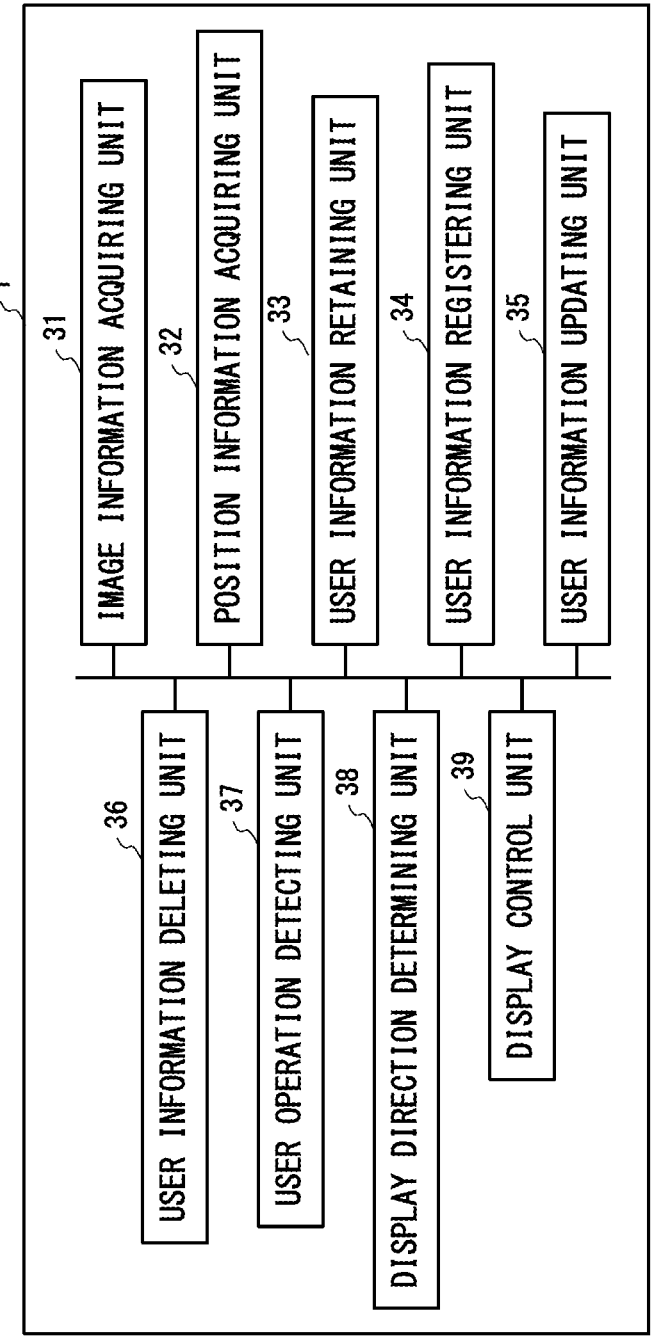
FIG. 11 is a diagram schematically showing a functional configuration of an information processing device according to an embodiment.

FIG. 11 is a diagram schematically showing a functional configuration of the information processing device 1 according to the present embodiment. Due to the CPU 11 interpreting and executing various programs deployed on the RAM 12, the information processing device 1 according to the present embodiment functions as an information processing device 1 comprising an image information acquiring unit 31, a position information acquiring unit 32, a user information retaining unit 33, a user information registering unit 34, a user information updating unit 35, a user information deleting unit 36, a user operation detecting unit 37, a display direction determining unit 38, and a display control unit 39. In addition, although an example in which all of these functions are executed by a general-purpose CPU 11 is explained in the present embodiment, a part of or all of these functions may be realized by one or a plurality of dedicated processors.

The image information acquiring unit 31 uses the sensor unit 20 to acquire image information including captured images in a range from which the directional display device 14 is viewable. In addition, the image information may include depth information acquired using a sensor unit 20 capable of measuring depths.

The position information acquiring unit 32 acquires position information of a plurality of objects (for example, the head of a user or the eyes of a user) within a range from which the directional display device 14 is viewable by analyzing image information. For example, user position information may be acquired by referring to depth information included in image information. Using depth information to acquire user position information enables an anteroposterior relation between users in a depth direction to be readily grasped. Moreover, in the present embodiment, while user position information is to be acquired by analyzing image information, other methods may be adopted for acquiring user position information. For example, user position information may be acquired using a sensor mat installed in a range from which the directional display device 14 is viewable, positional detection using sound waves, and the like.

The user information retaining unit 33 retains user information including user position information acquired by the position information acquiring unit 32 in a user information table on the RAM 12 or the auxiliary storage device 19.

FIG. 12 is a diagram showing a configuration of the user information table used in the present embodiment. User information is information for managing users who are recognized by the information processing device 1 and who exist in a range from which the directional display device 14 is viewable, and is stored in the user information table. User information includes user identification information, user position information, a user area map, and a non-discovery counter.

When user information relating to user position information acquired by the position information acquiring unit 32 is not retained in the user information retaining unit 33, the user information registering unit 34 registers and causes the user information retaining unit 33 to retain user information including the user position information.

When user position information acquired by the position information acquiring unit 32 is retained in the user information retaining unit 33, the user information updating unit 35 updates the user information using the user position information. With the information processing device 1 according to the present disclosure, a user can be tracked and a display direction can be adjusted so as to follow a latest user position by updating user position information.

When the user position information retained by the user information retaining unit 33 has not been updated, the user information deleting unit 36 deletes user information relating to the user position information.

The user operation detecting unit 37 detects an operation by a user by detecting, for each user, a predetermined gesture (action) that corresponds to the operation by the user from image information. However, while a case where an operation by a user is performed by a gesture is described in the present embodiment, an operation by a user need not necessarily be a gesture. For example, an operation by a user may be performed using a device operated by the user such as a controller or a mobile terminal device.

The display direction determining unit 38 determines a viewable display direction when the directional display device 14 is viewed from a position of an object based on a search result of a calibration table using position information.

As described earlier, the display control unit 39 according to the present embodiment controls display contents, display directions, and the like of the directional display device 14. In this case, based on position information of an object acquired by the position information acquiring unit 32, the display control unit 39 outputs contents for the object so as to be viewable from a position indicated by the position information. In other words, the information processing device 1 according to the present embodiment is enabled to function as a directional input/output device by including the directional display device 14 and the position information acquiring unit 32 that acquires position information of an object within a range from which the directional display device 14 is viewable.

Hereinafter, a flow of processing according to the present embodiment will be described with reference to the flow charts. Moreover, specific contents, a sequence of processing, and the like shown in the flowcharts in the present embodiment merely represent one example of implementing the present disclosure. Favorably, specific processing contents, a processing sequence, and the like may be appropriately selected for each embodiment.

Figure 13:
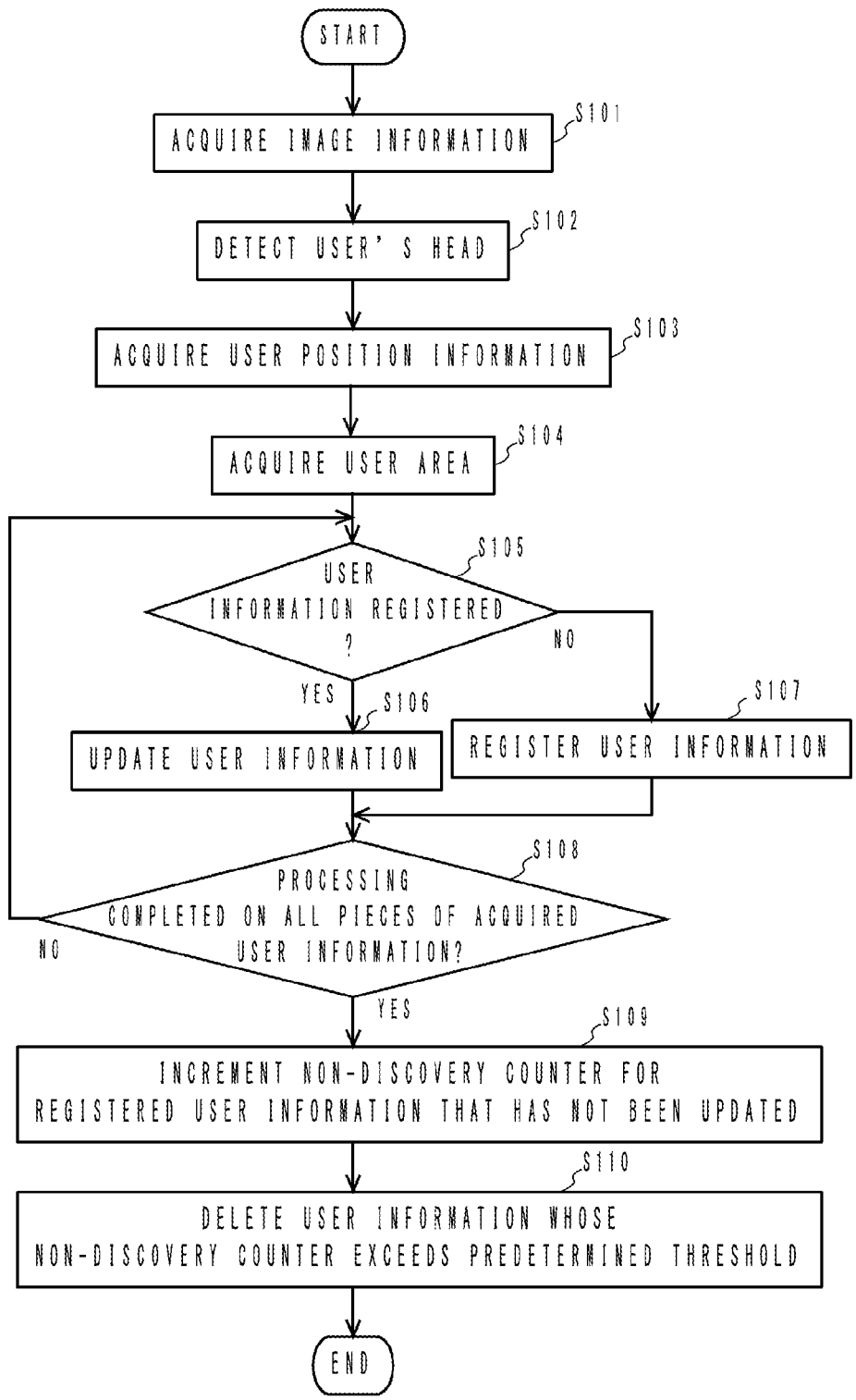
FIG. 13 is a flow chart showing a flow of user information management processing according to an embodiment.

FIG. 13 is a flow chart showing a flow of user information management processing according to the present embodiment. The processing shown in the present flow chart is continuously or periodically executed when the information processing device 1 is running.

In step S101, image information is acquired. The image information acquiring unit 31 acquires image information captured using the sensor unit 20. The image information acquired at this point may be a moving image which corresponds to a predetermined period of time and which has been clipped from a captured moving image or a still image which corresponds to a single frame and which has been clipped from a captured moving image. Whether to use a moving image or a still image as the acquired image information is favorably determined according to a system of image recognition technology adopted in the processing of steps S102 to S104. For example, when a system which detects an object moving inside an image as a user is adopted, image information including a moving image is acquired. In addition, image information acquired at this point may contain depth information indicating a distance (depth) from a point of view of imaging of the sensor unit 20 of each pixel in a captured image. Subsequently, the processing proceeds to step S102.

In step S102, a user's head is detected. Based on the image information acquired in step S101, the position information acquiring unit 32 detects a user's head from an image contained in the image information. However, an object of detection need only be used as a reference of a viewpoint position. For example, when desiring to have left and right eyes of a user view different contents (stereoscopic contents or the like), the user's left and right eyes are objects of detection. For the detection of the user's head, generally-used image analysis technology including facial recognition technology can be used. In addition, image analysis technology of any system may be used. Therefore, a description of details of the detection of the user's head will be omitted. For example, the position information acquiring unit 32 can detect a user's head by retaining a positional relationship between the eyes and the mouth or the like and extracting a feature with the positional relationship from an image.

In addition, when depth information is included in image information, depth information may be used to detect a user's head. Referring to depth information enables a distance (depth) from a point of view of imaging of the sensor unit 20 of each pixel in a captured image to be grasped. As a result, the position information acquiring unit 32 can readily extract a silhouette portion of a user, and by identifying a portion corresponding to the head from the silhouette portion of the user, the position information acquiring unit 32 can detect the user's head.

Once the user's head is detected, the processing proceeds to step S103. Moreover, while a user's head is detected and used as a reference for managing the user's position in the present embodiment, a detection object from image information need only be a portion of the body that can be used as a reference when indicating the user's position and is not limited to the user's head. In addition, eye gaze recognition technology can used to detect a user's head.

In step S103, user position information is acquired. The position information acquiring unit 32 acquires a position of the user's head for all user areas detected in step S102 as user position information. When desiring to have left and right eyes of a user view different contents (stereoscopic contents or the like), different user position information is to be acquired for the left and right eyes of the user. Subsequently, the processing proceeds to step S104.

In step S104, a user area is acquired. Based on the image information acquired in step S101, the position information acquiring unit 32 acquires an area in which the user is captured in the captured image (in other words, the silhouette portion of the user in the captured image). For the detection of a user area, generally-used image analysis technology can be used. In addition, image analysis technology of any system may be used. Therefore, a description of details of the detection of a user area will be omitted. For example, the position information acquiring unit 32 can acquire a user area by retaining a human-shaped silhouette in advance and extracting an edge that approximates the silhouette from an image. The position information acquiring unit 32 generates a user area map by mapping the acquired user area onto information corresponding to the captured image. For example, a user area map is information obtained by mapping pixels on which the user is captured by '1' and mapping pixels on which the user is not captured by '0' on a binary image with the same size as the captured image.

In addition, when depth information is included in image information, depth information may be used to acquire a user area. Referring to depth information enables a distance (depth) from a point of view of imaging of the sensor unit 20 of each pixel in a captured image to be grasped. Therefore, according to depth information, a silhouette portion of a user can be readily extracted as a user area. Once a user area is acquired, the processing proceeds to step S105.

In step S105, a judgment is made as to whether or not user information relating to the acquired user position information and the user area map is already registered. The information processing device 1 judges whether or not user information including the user position information acquired in step S103 and the user area map acquired in step S104 is already registered in the user information table. Whether or not acquired user information is already registered can be judged by comparing the acquired user information with user information that has already been registered. More specifically, by calculating a difference between the acquired user information and the user information that has already been registered, user information can be judged to be already registered when the difference is equal to or lower than a predetermined threshold and judged to be unregistered when the difference exceeds the predetermined threshold. When the acquired user information is judged to be already registered, the processing proceeds to step S106. On the other hand, when the acquired user information is judged not to be already registered, the processing proceeds to step S107.

In step S106, user information is updated. The user information updating unit 35 updates user information relating to the user by using the user information acquired in steps S103 and S104. As described earlier, the processing shown in the present flow chart is continuously or periodically executed when the information processing device 1 is running. Therefore, the user position information and the user area map included in the user information are updated to latest information in the present step. In addition, by referring to the user position information and the user area map included in the user information, the user operation detecting unit 37 can detect a gesture of the like from a latest user area and the display control unit 39 can perform display by the directional display device 14 so as to be viewable from a latest user position. Subsequently, the processing proceeds to step S108.

In step S107, user information is registered. The user information registering unit 34 newly generates user information, includes the user position information acquired in step S103 and the user area map acquired in step S104 in the user information, and registers the user information in the user information table. As described earlier, the processing shown in the present flow chart is continuously or periodically executed when the information processing device 1 is running. Therefore, the user information registered at this point is updated in step S106 as the processing described in the present flow chart is repetitively performed. Subsequently, the processing proceeds to step S108.

In step S108, a judgment is made on whether or not processing has been completed on all acquired user information. The information processing device 1 judges whether updating or registration of all user information acquired in steps S103 and S104 has been completed. When updating or registration of all acquired user information has been completed, the processing proceeds to step S109. When there is user information that has not been updated or registered, the processing proceeds to step S105. In other words, according to the processing shown in the present flow chart, the processing of steps S105 to S108 are repetitively performed until updating or registration of all user information acquired in steps S103 and S104 has been completed.

In step S109, the non-discovery counter is incremented for registered user information that has not been updated. The information processing device 1 identifies, from user information already registered in the user information table, user information not updated in step S106 or, in other words, user information relating to a user who had not been detected from image information even though the user information is already registered in the user information table. In addition, the information processing device 1 adds 1 to the non-discovery counter included in the identified user information. The non-discovery counter is reset to 0 (zero) when the user information is newly registered and when the user information is updated. In addition, as described earlier, the processing shown in the present flow chart is continuously or periodically executed when the information processing device 1 is running. In other words, the non-discovery counter is information indicating the number of times a user related to user information is consecutively not detected from image information in the user information management processing shown in the present flow chart. When updating of the non-discovery counter has been completed for all user information that has not been updated, the processing proceeds to step S110.

In step S110, user information whose non-discovery counter exceeds a predetermined threshold is deleted. The user information deleting unit 36 deletes user information whose non-discovery counter exceeds a predetermined threshold (for example, five) from user information already registered in the user information table. Accordingly, user information relating to a user who is not detected for a predetermined number of times or more can be deleted from the user information table on the assumption that the user has departed from the imaging range of the sensor unit 20.

Subsequently, the processing shown in the present flow chart is completed. However, as described earlier, the processing shown in the present flow chart is continuously or periodically executed when the information processing device 1 is running. Therefore, when the information processing device 1 is running, acquisition of image information, acquisition of user positions, and updating, registration, and deletion of user information are continuously or periodically executed.

Figure 14:
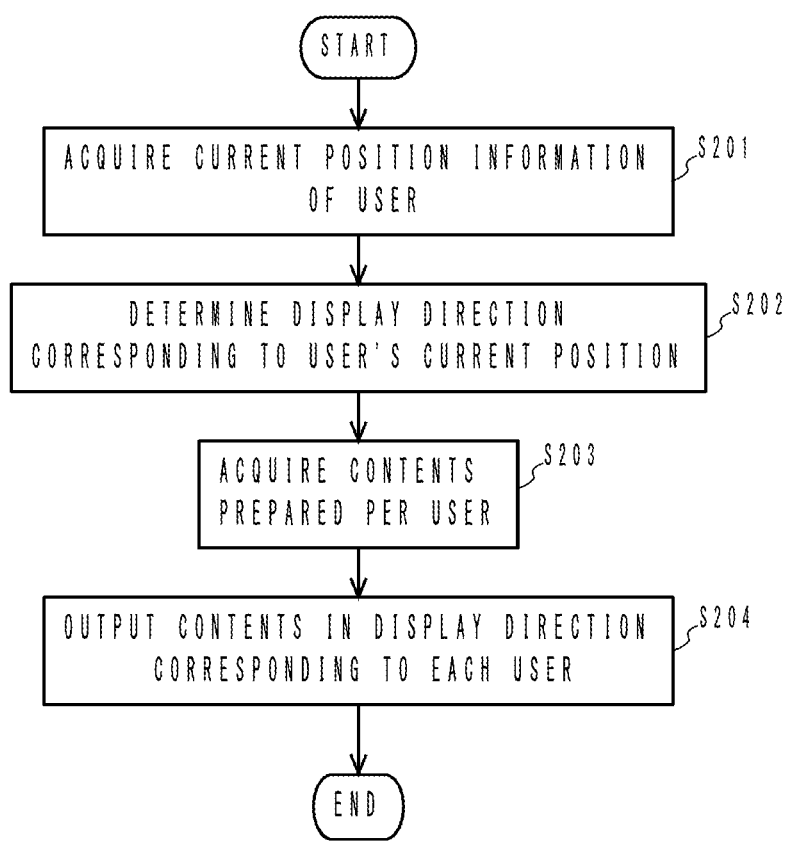
FIG. 14 is a flow chart showing a flow of directional display control processing according to an embodiment.

FIG. 14 is a flow chart showing a flow of directional display control processing according to the present embodiment. The processing shown in the present flow chart is continuously or periodically executed when the information processing device 1 is running.

In step S201, current position information of a user is acquired. The display direction determining unit 38 acquires user position information of a plurality of users within a range from which the directional display device 14 is viewable from the user information.

In step S202, a display direction corresponding to a current position of a user is determined. The display direction determining unit 38 searches a display direction associated with position information of a viewpoint position which matches or which is nearest to the position indicated by the user position information acquired in step S201 from the calibration table and determines the searched display direction as a display direction of display contents for the user. However, when position information which matches or sufficiently approximates (difference is smaller than a threshold) the user position information is not found in the calibration table, the display direction may be determined by complement processing based on plurality of pieces of position information and display directions stored in the calibration table. Once the display direction is detected, the processing proceeds to step S203.

In steps S203 and S204, contents prepared for each user are acquired and the contents are outputted in a display direction corresponding to each user. In order to make different contents viewable by each user, the display control unit 39 acquires contents prepared for each user from the RAM 12 or the auxiliary storage device 19 (step S203). In addition, for each user, the display control unit 39 outputs contents for the user in the display direction determined in step S202 (step S204). Subsequently, the processing shown in the present flow chart is completed.

Due to execution of the user information management processing and the directional display control processing described above, user information is updated to latest information and the information processing device 1 can perform display by the display device so as to be viewable from a latest user position. In other words, with the present embodiment, by updating user position information, a user can be tracked and a display direction can be adjusted so as to follow the latest user position.

A specific example where contents are outputted in a display direction corresponding to each user when a lenticular directional display device is used will now be described.

Figure 15:
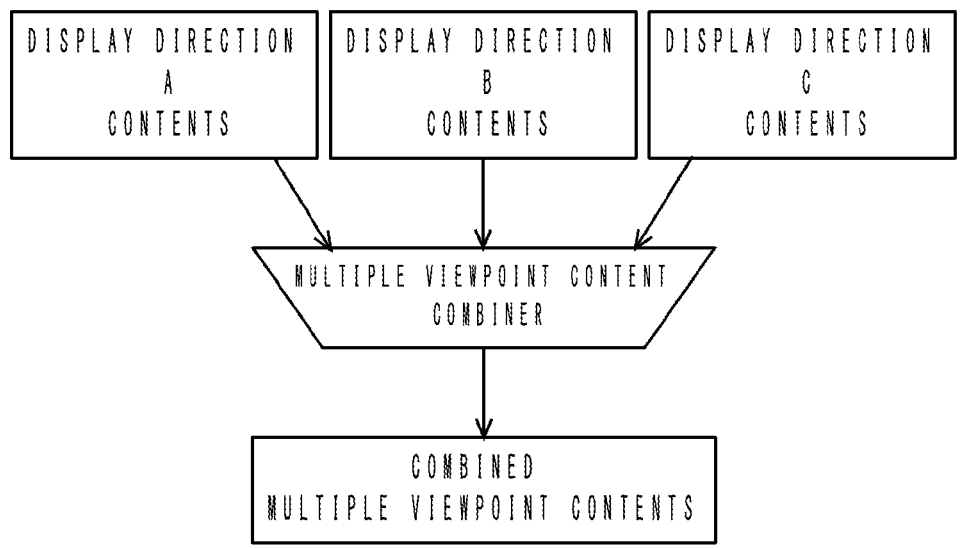
FIG. 15 is a diagram showing a concept of a multiple viewpoint content combiner for combining multiple viewpoint contents to be inputted to a lenticular directional display device.

FIG. 15 is a diagram showing a concept of a multiple viewpoint content combiner for combining multiple viewpoint contents to be inputted to a lenticular directional display device. The display control unit 39 prepares a plurality of contents (in the example shown in FIG. 15, contents (A) to (C)) and inputs the contents to a multiple viewpoint content combiner. The multiple viewpoint content combiner combines the inputted plurality of contents and causes the combined contents to be displayed by the directional display device. Accordingly, the directional display device displays contents that differ from one another in each display direction.

Figure 16:
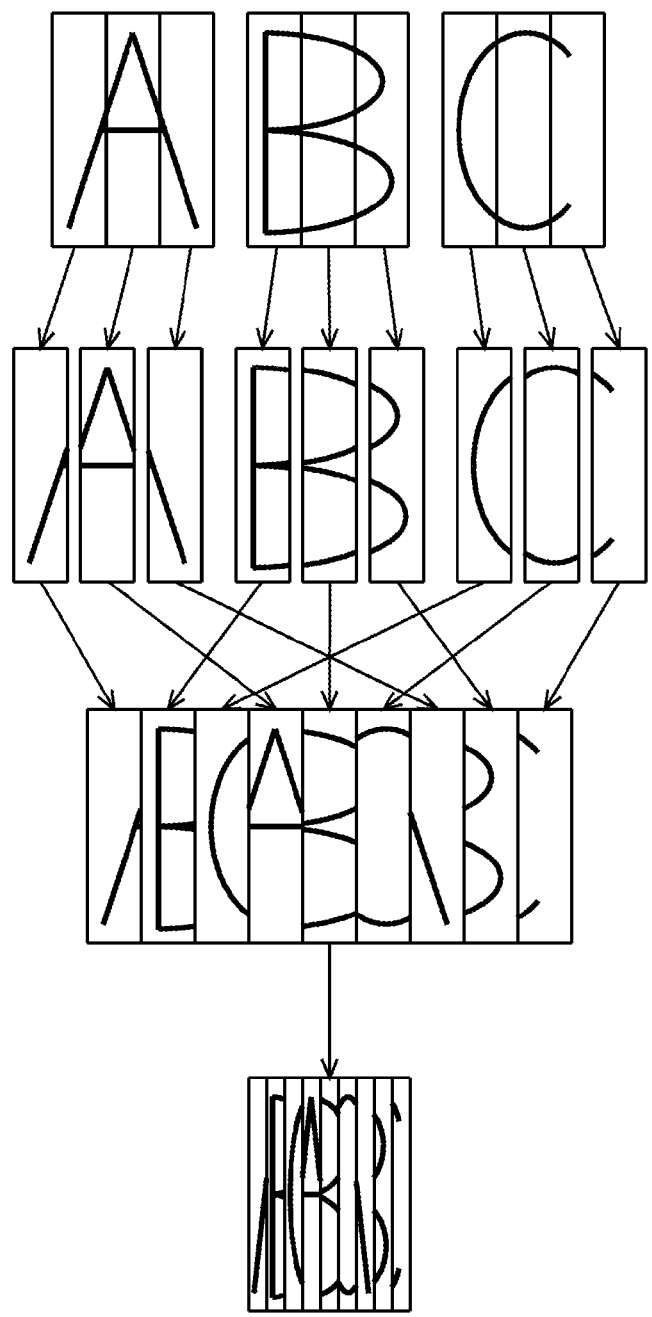
FIG. 16 is a diagram showing a concept of multiple viewpoint content combination when a lenticular directional display device is used.

FIG. 16 is a diagram showing a concept of multiple viewpoint content combination when a lenticular directional display device is used. When combining multiple viewpoint contents to be inputted to a uniaxial-directional display device that enables multiple viewpoints to be obtained in a horizontal direction, the display control unit 39 combines multiple viewpoint contents by respectively vertically slicing input contents prepared for each display direction (in the example shown in FIG. 16, the contents A, B, and C) and sequentially arranging the vertical slices. Hereinafter, arrangement orders of the contents A, B, and C will be referred to as "offsets". In the example shown in FIG. 16, offsets of 0, 1, or 2 are added to the contents A, B, and C. Each offset corresponds to each specific display direction based on characteristics of a lenticular lens and a display device.

In the case of a lenticular system, since a plurality of contents displayed in each display direction are combined into one content to which an offset is added, a display direction is determined by an offset. Therefore, display directions in the calibration table may be expressed by offsets or a conversion table between display directions and offsets may be additionally prepared. Furthermore, as a display direction, an angle expression of a temporal offset or a direction may be used depending on a system of the directional display device.

The example described above with reference to FIGS. 15 and 16 represents a case of performing directional display in a horizontal direction (uniaxial direction) by a lenticular system. There are various methods of combining multiple viewpoints such as a biaxial combination method involving horizontal and vertical axes when using a fly's eye lens and a time division combination method when using a flexible barrier system. Therefore, in addition to offsets, temporal offsets of vectors or display frames and the like may be used in accordance with combination methods as parameters corresponding to a display direction.

<Directional Display with Priority Control>

With the directional display device 14 as disclosed in the present embodiment, when contents that differ from one another are displayed to a plurality of users, a user may possibly move and enter a range of a viewpoint position from which contents for another user is viewable (in other words, enter a range of a same display direction as another user).

In the present embodiment, directional display with priority control may be performed in such situations in order to appropriately control display contents for each viewer. In the directional display with priority control according to the present embodiment, display of contents is not permitted to a user who does not have authority to view the contents.

In the present embodiment, a user can log into the system using a user account prepared in advance. A viewer authority is associated with a user account. Once logged in, the user can cause contents for which the user has viewing authority to be displayed in a display direction of the directional display device 14 that is viewable by the user. Display in a display direction that is viewable by the user is as described earlier with reference to the flow chart shown in FIG. 14.

In the present embodiment, a viewable authority level is respectively set to contents, and contents to which is set a viewable authority equivalent to or lower than a viewer authority of a user are displayed so as to be viewable to the user having the viewer authority. Moreover, a user not logged in may be treated as someone having a lowest level of viewer authority (a so-called guest user). In addition, as a login method, besides a method in which the user operation detecting unit 37 detects a gesture (a pass gesture) set in advance for each user, an input method using an interface for inputting a user name and a password may be adopted.

Figure 17:
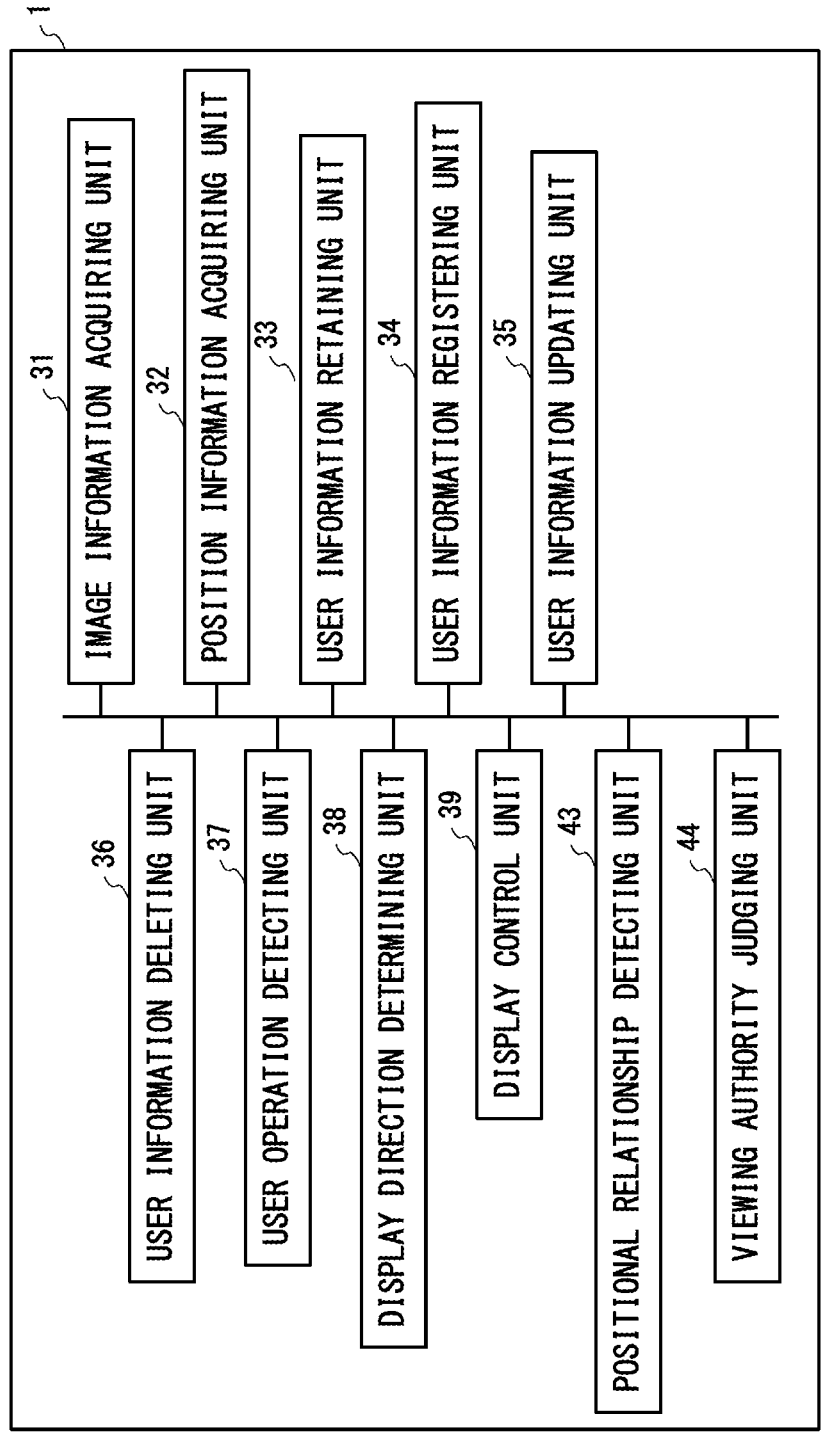
FIG. 17 is a diagram schematically showing a functional configuration when an information processing device according to an embodiment performs directional display with priority control.

FIG. 17 is a diagram schematically showing a functional configuration when the information processing device 1 according to the present embodiment performs directional display with priority control. Due to the CPU 11 interpreting and executing various programs deployed on the RAM 12, the information processing device 1 according to the present embodiment functions as an information processing device 1 comprising a positional relationship detecting unit 43 and a viewing authority judging unit 44 in addition to the image information acquiring unit 31, the position information acquiring unit 32, the user information retaining unit 33, the user information registering unit 34, the user information updating unit 35, the user information deleting unit 36, the user operation detecting unit 37, the display direction determining unit 38, and the display control unit 39 described with reference to FIG. 11. In addition, although an example in which all of these functions are executed by a general-purpose CPU 11 is explained in the present embodiment, a part of or all of these functions may be realized by one or a plurality of dedicated processors.

The display control unit 39 causes the directional display device 14 to perform display of contents of each user so as to be viewable from a position indicated by position information of each user. In this case, based on position information of an object acquired by the position information acquiring unit 32, the display control unit 39 outputs contents for the object so as to be viewable from a position indicated by the position information. However, in control processing of directional display with priority control, when a predetermined positional relationship is detected by the positional relationship detecting unit 43, the display control unit 39 causes the directional display device 14 to stop display of contents for which at least one of a plurality of users present in a same display direction does not have viewing authority among the contents.

The positional relationship detecting unit 43 detects that positions indicated by position information of a plurality of users are in a predetermined positional relationship in which contents displayed by the directional display device 14 in a same display direction are viewable.

The viewing authority judging unit 44 judges whether or not each user has viewing authority with respect to contents that are viewable by the user.

FIG. 18 is a diagram showing a configuration of a viewer authority management table according to the present embodiment. The viewer authority management table stores, for each user, a login ID required by the user to log into a system that controls display of contents by the directional display device 14 and information indicating a viewer authority of the user in association with each other.

FIG. 19 is a diagram showing a configuration of a content level management table according to the present embodiment. The content level management table stores, for each content, a content ID and a viewable authority that is required in order to view a content related to the content ID in association with each other.

Moreover, in addition to adopting a configuration in which the viewable authority of contents is set per file, a configuration may be adopted in which a structured document in XML or the like is used so that viewable authority can be set for each component of contents (sub-content).

Accordingly, the information processing device 1 can configure contents to be displayed to a user with a plurality of sub-contents and can perform display control (non-display, alternative display) for each sub-content.

Figure 20:
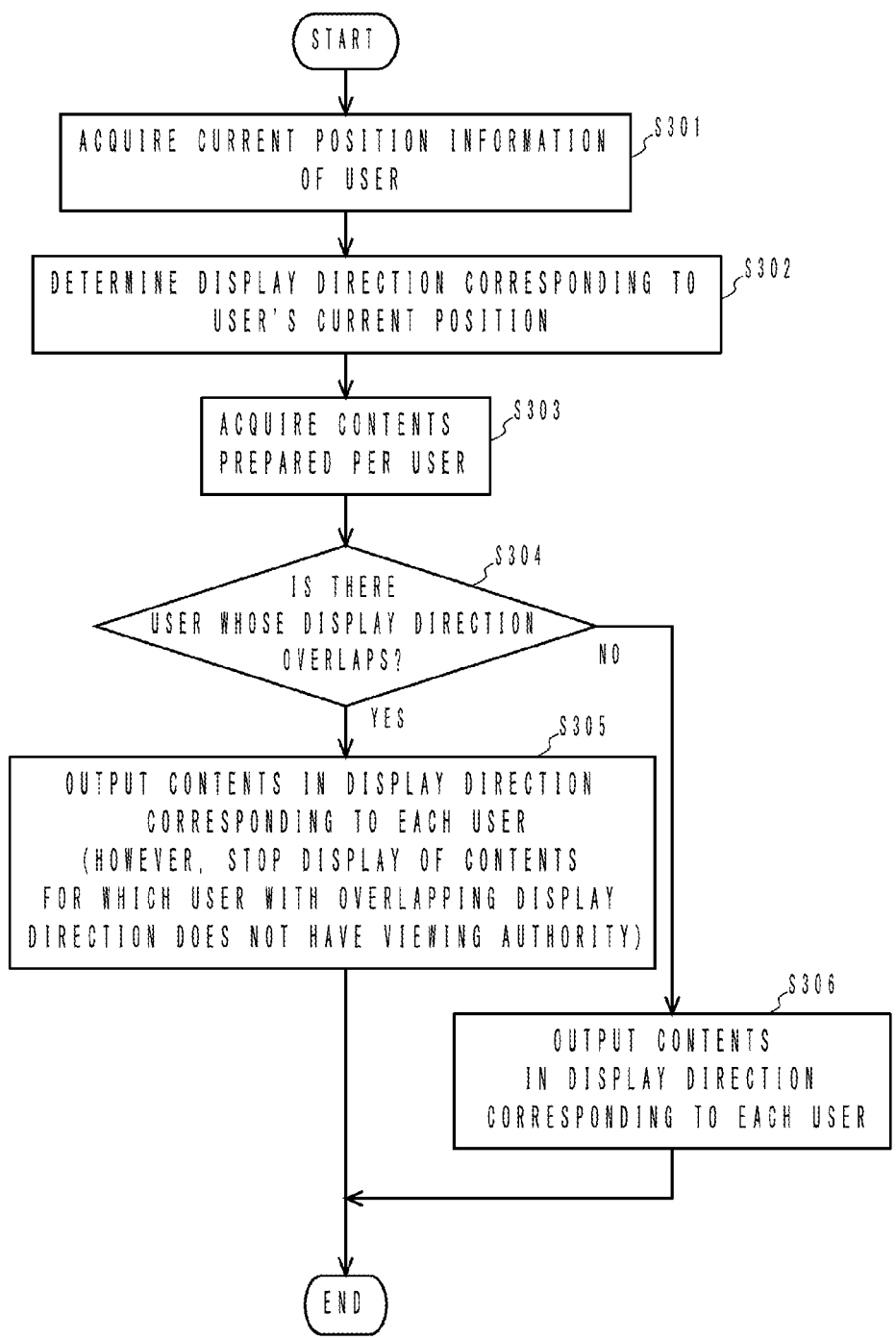
FIG. 20 is a flow chart showing a flow of directional display control processing with priority control according to an embodiment.

FIG. 20 is a flow chart showing a flow of directional display control processing with priority control according to the present embodiment. The processing shown in the present flowchart is executed in place of normal directional display control processing described with reference to FIG. 14 when control processing of directional display with priority control is performed.

In steps S301 to S303, current position information of a user is acquired, a display direction corresponding to a current position of the user is acquired, and contents prepared for each user are acquired. Since processing shown in steps S301 to S303 is approximately similar to the processing in steps S201 to S203 of the directional display control processing described with reference to FIG. 14, a description thereof will be omitted. Subsequently, the processing proceeds to step S304.

In step S304, the presence or absence of a user whose display direction overlaps is judged. The positional relationship detecting unit 43 detects that a plurality of users are in a predetermined positional relationship by comparing the display directions of the respective users acquired in step S302 and judging whether or not a user exists who is a different user but shares the same (or has a proximal) display direction. When a user whose display direction overlaps does not exist, the processing advances to step S306. On the other hand, when a user whose display direction overlaps exists, if display of contents per user is to be performed as usual, a situation may occur in which the contents are inadvertently displayed to a user whose viewer authority is lower than the viewable authority for the contents. Therefore, when a user whose display direction overlaps exists, the processing advances to step S305.

In step S305, contents are outputted in a display direction corresponding to each user. However, with respect to a user whose display direction overlaps, display of contents for which the user does not have viewing authority is stopped. The viewing authority judging unit 44 judges a presence or absence of viewing authority of each user with respect to contents viewable by the user by identifying a lowest authority among a user for which overlapping of display directions has been detected in step S304 and comparing the lowest authority with a viewable authority of contents displayed in a display direction related to the user. In addition, while the display control unit 39 outputs, per user, contents for the user, by not outputting contents that are not viewable even if the authority for the contents is the lowest, display of contents for which at least any of the plurality of users in a same display direction does not have viewing authority is stopped. Accordingly, the contents can be prevented from being viewed by a user without viewing authority. Subsequently, the processing shown in the present flow chart is completed.

In step S306, contents are outputted in a display direction corresponding to each user. The display control unit 39 outputs, per user, contents for the user. Subsequently, the processing shown in the present flow chart is completed.

Figure 21:
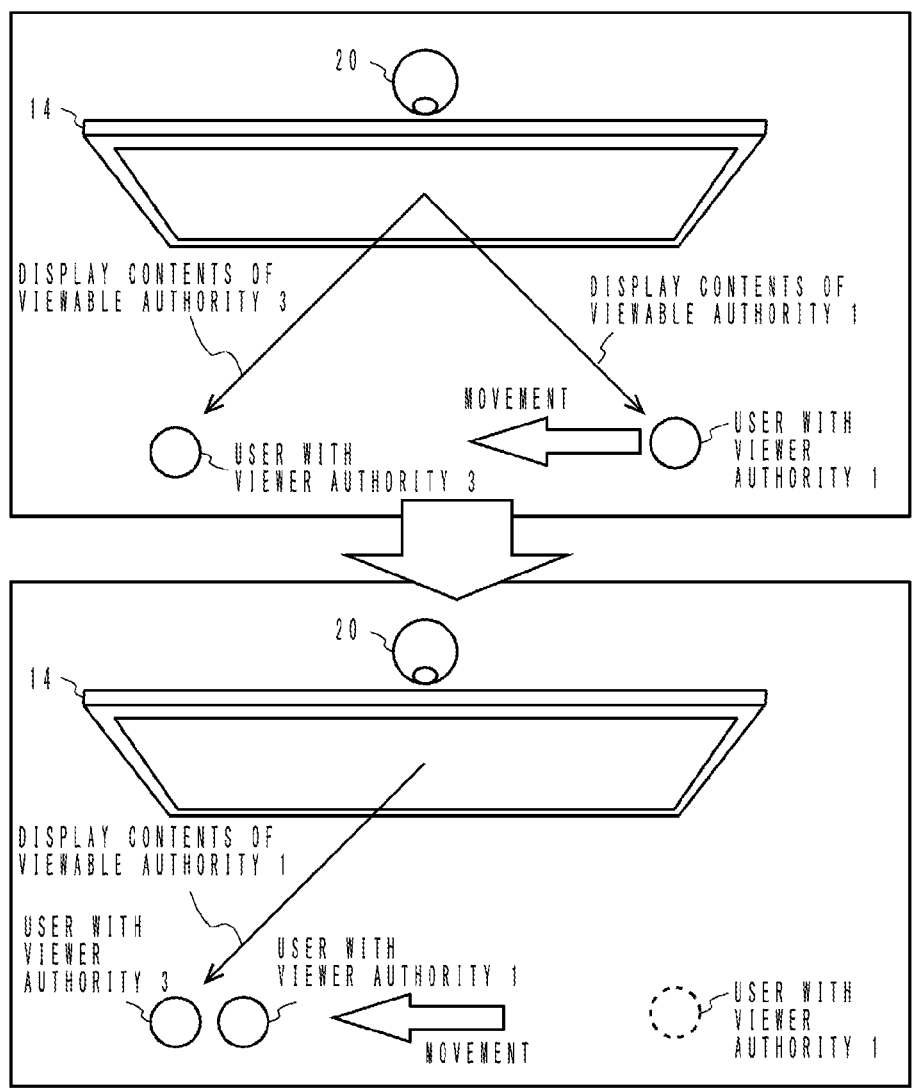
FIG. 21 is a diagram illustrating a change in contents according to an embodiment.

FIG. 21 is a diagram illustrating a change in contents according to the present embodiment. FIG. 21 shows how displayed contents are changed when a user with authority level 1 enters a display direction in which contents with authority level 3 are displayed so that level 1 contents are displayed in the display direction of level 3 contents.

Moreover, while display of contents not viewable even with the lowest authority is stopped when a predetermined positional relationship is detected in the flow chart described above, other display control may be adopted instead of such control. For example, when a predetermined positional relationship is detected, the display control unit 39 may replace displayed contents with alternative contents that are viewable even with the lowest authority. In addition, when a predetermined positional relationship is detected, the display control unit 39 may stop display of all contents in the direction.

<Calibration in Consideration of Display Area Parallax>

Figure 22:
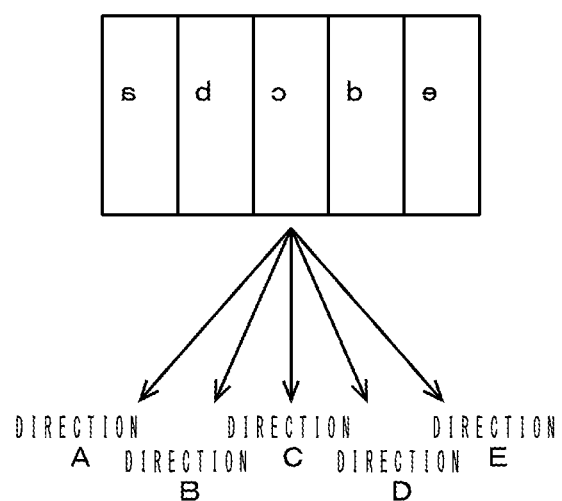
FIG. 22 is a diagram showing an example of a display direction in a directional display device.

FIG. 22 is a diagram showing an example of a display direction in the directional display device 14. The directional display device 14 shown in FIG. 22 is capable of outputting contents that differs from one another in five directions including display directions 1 to 5. With the directional display device 14 described above, when a size of an entire display area in which contents are displayed is too large to ignore with respect to a distance from the display area to a user, directions (angles) from respective partial areas (a) to (e) on the display area to the user significantly differ from one another. Therefore, with the directional display device 14, a situation may occur in which consistent display cannot be performed to a user when the user approaches a display area. Hereinafter, a difference in display directions as viewed by users due to a difference in directions of the users from respective partial areas on the display area (a difference in angles with respect to planes of the partial areas) will be referred to as a "display area parallax".

Figure 23:
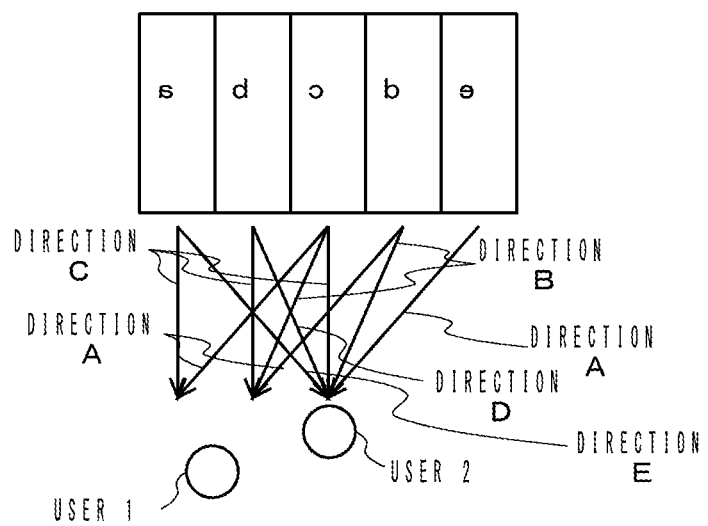
FIG. 23 is a diagram showing an example of a state where a display area parallax has occurred.

FIG. 23 is a diagram showing an example of a state where a display area parallax has occurred. In the situation shown in FIG. 23, a user 1 views contents outputted with the front of the directional display device 14 set as display directions with respect to partial areas (a) and (b) but views contents outputted with respectively different directions set as display directions with respect to partial areas (c), (d), and (e). In this case, in order to produce display that is consistent across the entire display area of the directional display device 14, contents are displayed by changing the display direction of contents for the user 1 for each partial area. In the example shown in FIG. 23, for instance, in order to display consistent contents to a user 2, control is performed such that partial area (a)—display direction (E), partial area (b)—display direction (D), partial area (c)—display direction (C), partial area (d)—display direction (B), and partial area (e)—display direction (A).

Therefore, the present embodiment addresses the problem of display area parallax described above by performing calibration for each partial area of the directional display device 14.

Figure 24:
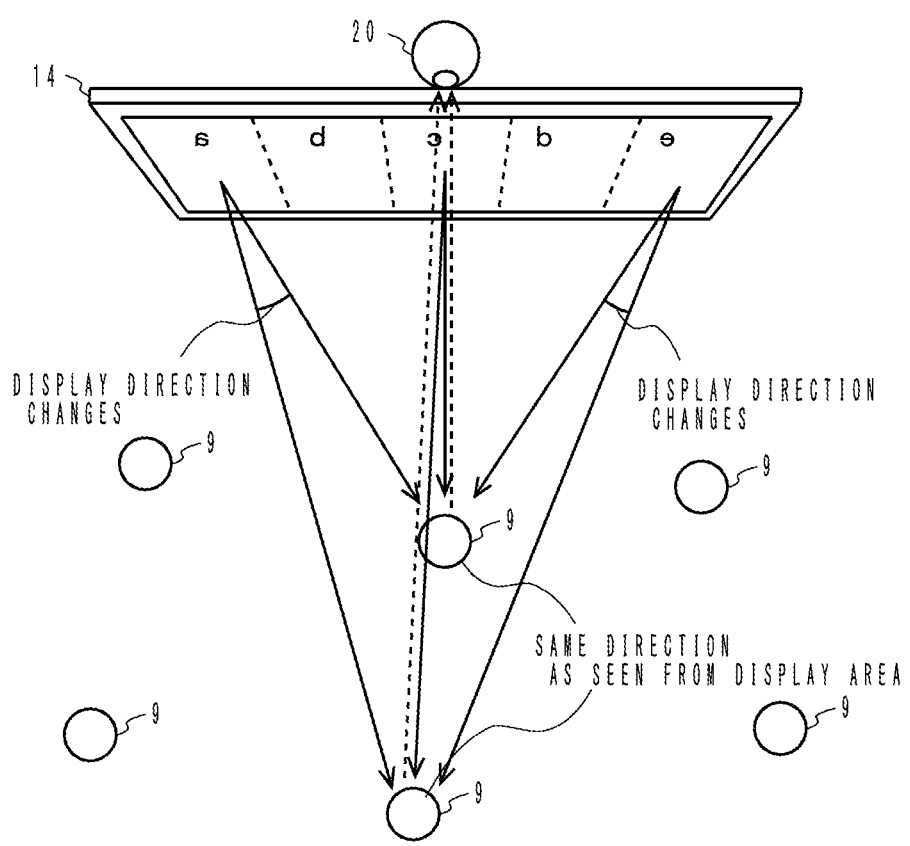
FIG. 24 is a diagram showing how detectors are installed for calibration that takes a display area parallax into consideration according to an embodiment.

FIG. 24 is a diagram showing how detectors 9 are installed for calibration that takes a display area parallax into consideration according to the present embodiment. While the detectors 9 are installed at positions from which display by the directional display device 14 is viewable, in the present embodiment, the detectors 9 are further installed at positions where distances from a display area are changed even though the positions are in an approximately same direction as seen from the display area. This is because, even with a viewpoint position in the same direction as seen from the display area, depending on a partial area, an angle (display direction) as seen from the partial area may change if a distance from the partial area to the viewpoint position changes.

In a similar manner to the calibration device described with reference to FIG. 8, a calibration device for calibration that takes a display area parallax into consideration includes a detector information acquiring unit 40, a display control unit 39, a display direction acquiring unit 41, and an associating unit 42 due to the CPU 11 interpreting and executing various programs deployed on the RAM 12.

FIG. 25 is a diagram showing a configuration of a calibration table that takes a display area parallax into consideration according to the present embodiment. While the position information described with reference to FIG. 9 and display direction are associated with each other for each installation position of the detector 9 in a calibration table created by calibration that does not take a display area parallax into consideration, an identifier of a partial area is further associated with position information and display direction in the calibration table that takes a display area parallax into consideration. Moreover, while a calibration table that does not take a display area parallax into consideration may adopt a parameter representing only a direction from a predetermined reference (for example, the sensor unit 20 or the directional display device 14) as position information, a parameter only representing a direction is insufficient as position information in a calibration table that takes a display area parallax into consideration. Therefore, with a calibration table that takes a display area parallax into consideration, a parameter that also enables a distance from the predetermined reference to be determined is adopted as position information.

Figure 26:
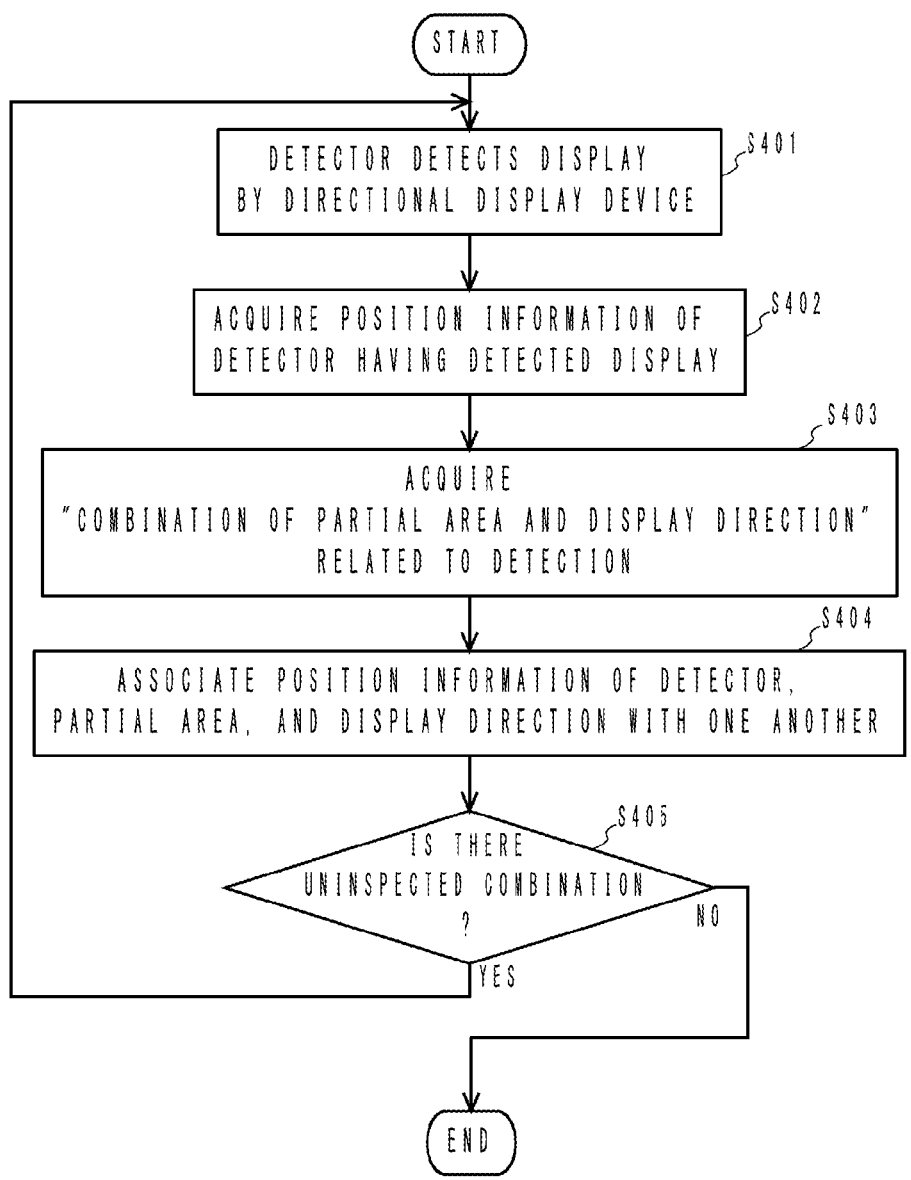
FIG. 26 is a flow chart showing a flow of processing for creating a calibration table that takes a display area parallax into consideration according to an embodiment.

FIG. 26 is a flow chart showing a flow of processing for creating a calibration table that takes a display area parallax into consideration according to the present embodiment. Moreover, specific contents, a sequence, and the like of the processing merely represent one example. Favorably, specific processing contents, a processing sequence, and the like are appropriately selected.

In step S401, display by the directional display device 14 and detection of the display by the detector 9 are performed. The display control unit 39 causes the directional display device 14 to perform display in one uninspected combination among "combinations of a partial area and a display direction" of the directional display device 14. In this case, the display by the display control unit 39 is to be performed at a different timing for each "combination of a partial area and a display direction". In addition, the detector 9 performs detection of display while the display is being performed. Subsequently, the processing proceeds to step S402.

In step S402, position information of the detector 9 having detected the display is acquired. Since processing shown in step S402 is approximately similar to the processing in step S002 of the calibration processing described with reference to FIG. 10, a description thereof will be omitted. Subsequently, the processing proceeds to step S403.

In step S403, a "combination of a partial area and a display direction" related to the detection is acquired. When there is a detector 9 having detected display in step S401, the display direction acquiring unit 41 acquires the "combination of a partial area and a display direction" in which the display had been performed in step S401 as a combination in which display is recognizable from the position where the detector 9 is installed. Since the display by the display control unit 39 differs in timing for each combination, the display direction acquiring unit 41 is able to acquire a combination with which the display had been performed based on a timing at which the display had been detected. Subsequently, the processing proceeds to step S404.

In step S404, the position information of the detector 9, the partial area, and the display direction are associated with each other. The associating unit 42 associates the position information of the detector 9 acquired in step S402 and the "combination of a partial area and a display direction" in which the display had been performed in step S401 with each other and records the associated position information and combination in the calibration table. Subsequently, the processing proceeds to step S405.

In step S405, a judgment is made on whether or not there is an uninspected "combination of a partial area and a display direction". The calibration device judges whether or not there is a "combination of a partial area and a display direction" which is an inspection object but which is uninspected. When it is judged that there is an uninspected combination, the processing proceeds to step S401. In other words, in the processing shown in the present flow chart, the processing of steps S401 to S403 is repeated until inspection is performed for all "combinations of a partial area and a display direction" that are objects of the inspection. On the other hand, when it is judged that there is no uninspected combination, the processing shown in the present flow chart is completed.

<Directional Display in Consideration of Display Area Parallax>

Next, directional display that takes a display area parallax into consideration will be described.

Due to the CPU 11 interpreting and executing various programs deployed on the RAM 12, in a similar manner to the information processing device described with reference to FIG. 11, the information processing device 1 for directional display that takes a display area parallax into consideration comprises an image information acquiring unit 31, a position information acquiring unit 32, a user information retaining unit 33, a user information registering unit 34, a user information updating unit 35, a user information deleting unit 36, a user operation detecting unit 37, a display direction determining unit 38, and a display control unit 39.

As described earlier, the display direction determining unit 38 determines a viewable display direction when the directional display device 14 is viewed from a position of an object based on a search result of a calibration table using position information. However, in control processing of directional display that takes a display area parallax into consideration, the display direction determining unit 38 determines a display direction for each partial area in the directional display device 14 based on a search result of a calibration table using position information.

As described earlier, the display control unit 39 according to the present embodiment controls display contents, display directions, and the like of the directional display device 14. In the control processing of directional display that takes a display area parallax into consideration, for each partial area, the display control unit 39 causes contents to be displayed in the display direction determined by the display direction determining unit 38 for each partial area.

Next, a flow of control processing of directional display that takes a display area parallax into consideration will be described with reference to a flow chart. However, since user information management processing is approximately similar to the flow of processing described with reference to FIG. 13, a description thereof will be omitted.

Figure 27:
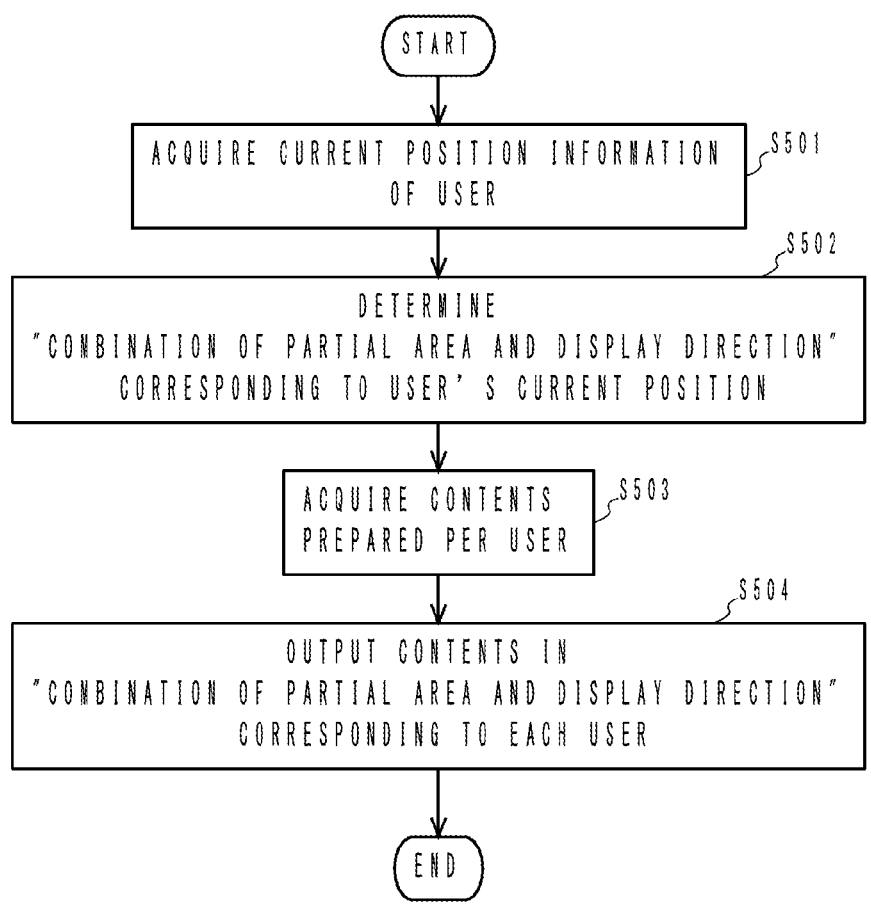
FIG. 27 is a flow chart showing a flow of processing for performing control processing of directional display that takes a display area parallax into consideration according to an embodiment.

FIG. 27 is a flow chart showing a flow of processing for performing control processing of directional display that takes a display area parallax into consideration according to the present embodiment. Moreover, specific contents, a sequence, and the like of the processing merely represent one example. Favorably, specific processing contents, a processing sequence, and the like are appropriately selected.

In steps S501 and S502, current position information of a user is acquired and a "combination of a partial area and a display direction" corresponding to a current position of the user is determined. The display direction determining unit 38 acquires user position information of a plurality of users within a range from which the directional display device 14 is viewable from the user information (step S501). In addition, the display direction determining unit 38 searches a "combination of a partial area and a display direction" associated with position information of a viewpoint position which matches or which is nearest to the position indicated by the user position information acquired in step S501 from the calibration table and determines the searched combination as a "combination of a partial area and a display direction" of display contents for the user (step S502).

FIG. 28 is a diagram showing a configuration of a partial area table used in the present embodiment. A "combination of a partial area and a display direction" determined for each user may be managed by a partial area table prepared for each user. The partial area table of each user that is created in this manner stores a display direction for each user for each partial area and is updated when a movement of the user is tracked and the user information table is updated by user information management processing.

Moreover, since processing in a case where position information which matches or sufficiently approximates (difference is smaller than a threshold) the user position information is not found in the calibration table as well as complement processing are approximately similar to step S202 of the directional display control processing described with reference to FIG. 14, a description thereof will be omitted. Once a "combination of a partial area and a display direction" is determined, processing advances to step S503.

In steps S503 and S504, contents prepared for each user are acquired and the contents are outputted in a "combination of a partial area and a display direction" corresponding to each user. In order to make different contents viewable by each user, the display control unit 39 acquires contents prepared for each user from the RAM 12 or the auxiliary storage device 19 (step S503). In addition, for each user, the display control unit 39 outputs contents for the user in the "combination of a partial area and a display direction" determined in step S502 (step S504). Subsequently, the processing shown in the present flow chart is completed.

A specific example where contents are outputted in a "combination of a partial area and a display direction" corresponding to each user when a lenticular directional display device is used will now be described. However, since a concept of a multiple viewpoint content combiner and a concept of general multiple viewpoint content combination are as described with reference to FIGS. 15 and 16, a description thereof will be omitted.

Figure 29:
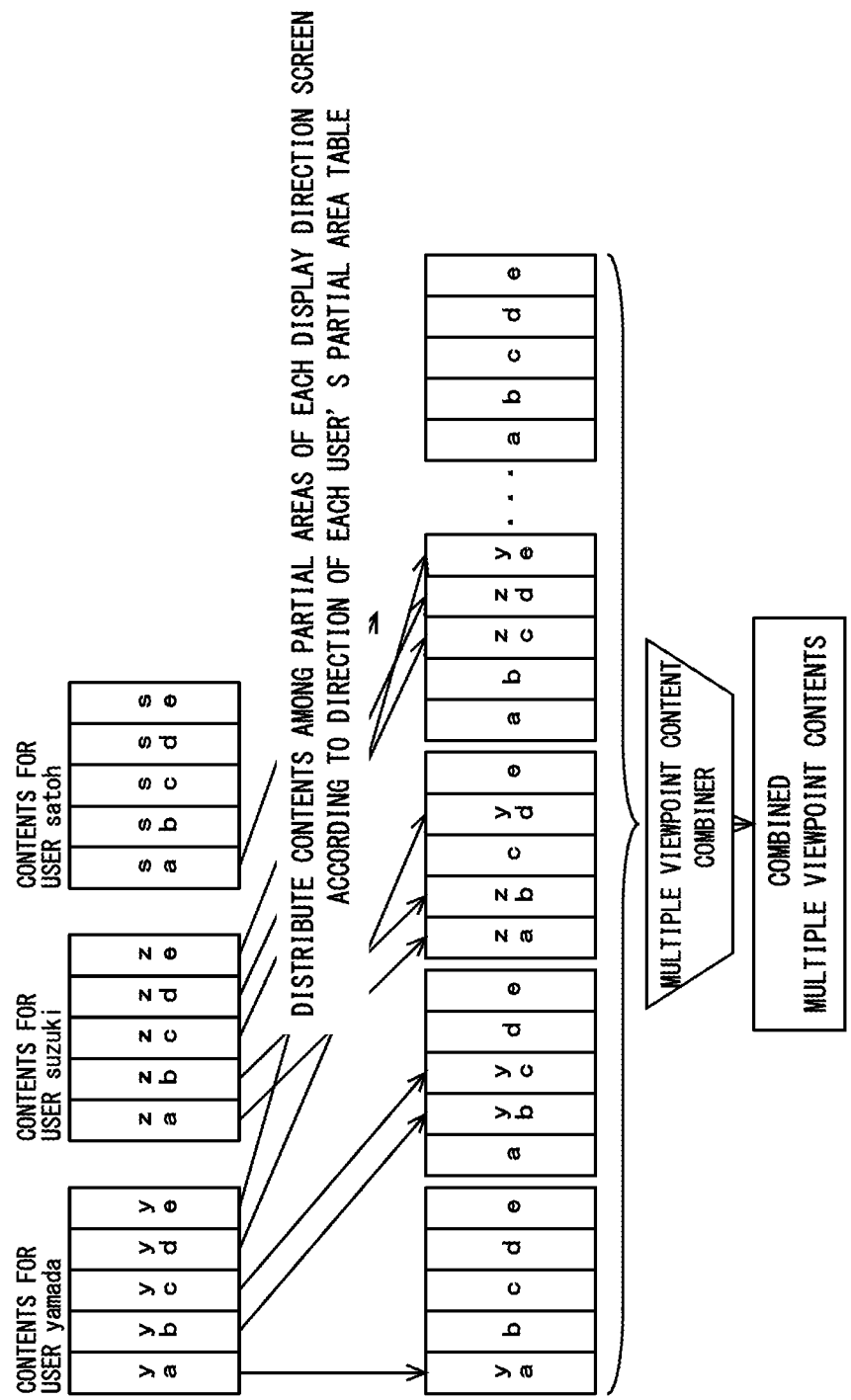
FIG. 29 is a diagram showing a concept of multiple viewpoint content combination that takes a display area parallax into consideration when a lenticular directional display device is used.

FIG. 29 is a diagram showing a concept of multiple viewpoint content combination that takes a display area parallax into consideration when a lenticular directional display device is used. In the example shown in FIG. 29, the display control unit 39 creates each display direction screen to be inputted to the multiple viewpoint content combiner by acquiring contents prepared for each user from the RAM 12 or the auxiliary storage device 19, dividing each user screen into partial areas, and distributing the contents to the partial areas of each display direction screen according to a direction of each user's partial area table. The multiple viewpoint content combiner having received input of each display direction screen generates a combined screen (multiple viewpoint contents) to be inputted to the lenticular directional display device. Due to a combined screen generated in this manner being inputted to the lenticular directional display device, contents for each user are outputted for each "combination of a partial area and a display direction" determined in step S502.

Moreover, the control processing of directional display that takes a display area parallax into consideration described above may be used in combination with the priority control described with reference to FIG. 20. For example, when a user moves into a viewing direction of at least one partial area of another user, priority control such as hiding the partial area or hiding an entire display intended for the other user may be performed.

In addition, by tracking respective positions of the left and right eyes of each user in user information management processing and performing appropriate display with respect to each of the left and right eyes in control processing of directional display that takes a display area parallax into consideration, consistent stereoscopic display can be performed even when a distance from a display area is small. This stereoscopic display is effective even when there are a plurality of users.

Furthermore, as a method of creating each user's partial area table, a method involving arithmetic processing may be used in place of a method involving creating a calibration table by the calibration processing described earlier and generating a user's partial area table by obtaining a display direction of each partial area.

Figure 30:
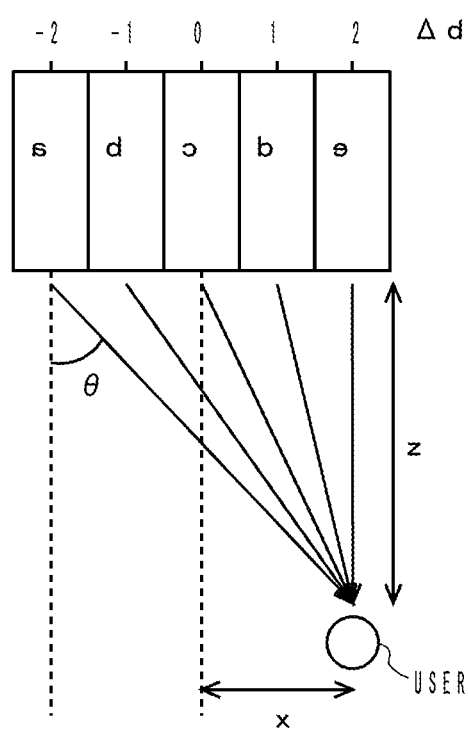
FIG. 30 is a diagram showing an example of an arithmetic processing method for creating each user's partial area table from a user information table.

FIG. 30 is a diagram showing an example of an arithmetic processing method for creating each user's partial area table from a user information table. In addition, FIG. 31 is a diagram showing a configuration of each user's partial area table created by an arithmetic processing method. If Δd denotes a displacement of a partial area a, b, c, d, or e from a center of a display area, z denotes a distance of a user from the center of the display area, and x denotes a displacement of the user from a center line of the display area, and x and z are known based on input information from the sensor unit 20 or the like, an angle θ of the user as seen from each partial area can be obtained by the following mathematical expression.

$$\theta = \arctan((x - \Delta d)/z)$$

<Applications of Information Processing Device>

Hereinafter, specific examples of applying the information processing device 1 according to the present embodiment to various uses will be described. It should be noted that the applications described below are merely examples and objects of application of the present disclosure are not limited to the examples described below.

(1) Elevator

By adopting a control device of an elevator as the control device to which the information processing device 1 according to the present embodiment is connected, the information processing device 1 can be configured as a human interface device for processing an operation for specifying a destination floor of the elevator, an operation for opening or closing the door of the elevator, and the like.

(2) Car Navigation Device/Audio Device

By adopting a control device of a car navigation device/audio device as the control device to which the information processing device 1 according to the present embodiment is connected, the information processing device 1 can be configured as a human interface device for processing a tune selection operation, a volume adjustment operation, a mute operation, and the like of the car navigation device/audio device.

(3) Information Kiosk Terminal, Self-Checkout Terminal

By adopting a control device of an information kiosk terminal or a self-checkout terminal as the control device to which the information processing device 1 according to the present embodiment is connected, the information processing device 1 can be configured as a human interface device for processing operations performed on the information kiosk terminal or the self-checkout terminal.

(4) Electrical Appliance

In addition, by adopting a control device of an electrical appliance as the control device to which the information processing device 1 according to the present embodiment is connected, the information processing device 1 can be configured as a human interface device for processing operations performed on the electrical appliance.

What is claimed is:

1. An information processing device connected to a display device capable of varying display contents according to display directions, the information processing device comprising:
 a position information acquiring unit to acquire position information on an object within a range from which the display device is viewable;
 a display direction determining unit to determine, based on the position information, a first display direction in which a first partial area of the display device is viewable from a position of the object and a second display direction in which a second partial area of the display device is viewable from the position of the object; and
 a display control unit which causes the display device to display contents so that the contents are displayed in the first display direction in the first partial area and the contents are displayed in the second display direction in the second partial area, wherein
 the position information acquiring unit acquires position information on a first object and position information on a second object that differs from the first object,
 the display direction determining unit determines the first display direction and the second display direction for each object based on position information on each of the objects, and
 the display control unit causes,
 in the first partial area, contents for the first object to be displayed in the first display direction related to the first object and contents for the second object to be displayed in the first display direction related to the second object, and
 in the second partial area, contents for the first object to be displayed in the second display direction related to the first object and contents for the second object to be displayed in the second display direction related to the second object.

2. The information processing device according to claim 1, which is connected to a storage device that retains relationship information including a relationship between a position within a range from which the display device is viewable and a display direction, for each partial area, in which the partial area is viewable from the position, wherein
 the display direction determining unit determines a display direction in which the first partial area or the second partial area is viewable from the object based on a result of searching of the relationship information in use of the positional information.

3. The information processing device according to claim 1, wherein the object is a portion of a user's body.

4. The information processing device according to claim 3, wherein the object is a user's head or a user's eyes.

5. The information processing device according to claim 1, wherein
the first object is the left eye of a user and the second object is the right eye of the user.

6. An information processing method in which a computer connected to a display device capable of varying display contents according to display directions executes the steps of:
acquiring position information on an object within a range from which the display device is viewable;
determining, based on the position information, a first display direction in which a first partial area of the display device is viewable from a position of the object and a second display direction in which a second partial area of the display device is viewable from the position of the object; and
causing the display device to display contents so that the contents are displayed in the first display direction in the first partial area and the contents are displayed in the second display direction in the second partial area, wherein
the acquiring involves acquiring position information on a first object and position information on a second object that differs from the first object,
the determining involves determining the first display direction and the second display direction for each object based on position information on each of the objects, and
the causing involves causing,
in the first partial area, contents for the first object to be displayed in the first display direction related to the first object and contents for the second object to be displayed in the first display direction related to the second object, and
in the second partial area, contents for the first object to be displayed in the second display direction related to the first object and contents for the second object to be displayed in the second display direction related to the second object.

7. A computer-readable non-transitory recording medium recorded with a program for causing a computer connected to a display device capable of varying display contents according to display directions to function as:
a position information acquiring unit to acquire position information on an object within a range from which the display device is viewable;
a display direction determining unit to determine, based on the position information, a first display direction in which a first partial area of the display device is viewable from a position of the object and a second display direction in which a second partial area of the display device is viewable from the position of the object; and
a display control unit that causes the display device to display contents so that the contents are displayed in the first display direction in the first partial area and the contents are displayed in the second display direction in the second partial area, wherein
the position information acquiring unit acquires position information on a first object and position information on a second object that differs from the first object,
the display direction determining unit determines the first display direction and the second display direction for each object based on position information on each of the objects, and
the display control unit causes,
in the first partial area, contents for the first object to be displayed in the first display direction related to the first object and contents for the second object to be displayed in the first display direction related to the second object, and
in the second partial area, contents for the first object to be displayed in the second display direction related to the first object and contents for the second object to be displayed in the second display direction related to the second object.

* * * * *